United States Patent [19]
Xu et al.

[11] Patent Number: 5,973,444
[45] Date of Patent: Oct. 26, 1999

[54] CARBON FIBER-BASED FIELD EMISSION DEVICES

[75] Inventors: Xueping Xu, Danbury; Charles P. Beetz, New Milford; George R. Brandes, Southbury; Robert W. Boerstler, Woodbury, all of Conn.; John W. Steinbeck, Fitzwilliam, N.H.

[73] Assignee: Advanced Technology Materials, Inc., Danbury, Conn.

[21] Appl. No.: 09/191,269

[22] Filed: Nov. 12, 1998

Related U.S. Application Data

[63] Continuation of application No. 08/575,485, Dec. 20, 1995, Pat. No. 5,872,422.

[51] Int. Cl.$^6$ .................................................. H01J 1/30
[52] U.S. Cl. ................................. 313/309; 313/311
[58] Field of Search .......................... 313/309, 311, 313/346 R

[56] References Cited

U.S. PATENT DOCUMENTS

| | | | |
|---|---|---|---|
| 4,041,346 | 8/1977 | Bursey et al. | 313/336 |
| 4,272,699 | 6/1981 | Faubel et al. | 313/360 |
| 4,301,369 | 11/1981 | Matsuo et al. | 250/423 |
| 5,395,774 | 3/1995 | Bajor et al. | 437/31 |
| 5,583,393 | 12/1996 | Jones | 313/495 |
| 5,726,524 | 3/1998 | Debe | 313/309 |
| 5,773,921 | 6/1998 | Keesmann et al. | 313/309 |
| 5,872,422 | 2/1999 | Xu et al. | 313/346 R |

OTHER PUBLICATIONS

N.M. Rodriguez, "A Review of Catalytically Grown Carbon Nanofibers", J. Mater. Res., Dec. 1993, vol. 8, No. 12, pp. 3233–3250.

Walt A. de Heer, A. Chatelain, D. Ugarte, "A Carbon Nanotube Field–Emission Electron Source", Science, Nov. 17, 1995, vol. 270, pp. 1179–1180.

L.A. Chernozatonskii, et al., "Electron Field Emission from Nanofilament Carbon Films", Chemical Physics Letters, Feb. 3, 1995, vol. 233, pp. 63–68.

Walt A. de Heer, et al., "Aligned Carbon Nanotube Films: Production and Optical and Electronic Porperties", Science, May 12, 1995, vol. 268, pp. 845–847.

*Primary Examiner*—John Goodrow
*Attorney, Agent, or Firm*—Oliver A.M. Zitzman

[57] ABSTRACT

Electron field emission devices (cold cathodes), vacuum microelectronic devices and field emission displays which incorporate cold cathodes and methods of making and using same. More specifically, cold cathode devices comprising electron emitting structures grown directly onto a substrate material. The invention also relates to patterned precursor substrates for use in fabricating field emission devices and methods of making same and also to catalytically growing other electronic structures, such as films, cones, cylinders, pyramids or the like, directly onto substrates.

52 Claims, 12 Drawing Sheets

CARBON FIBER-BASED FIELD EMISSION DEVICES

This application is a continuation of application Ser. No. 08/575,485, filed Dec. 20, 1995, now U.S. Pat. No. 5,872,422, which is incorporated herein by reference.

BACKGROUND OF THE INVENTION

1. Field of the Invention

The present invention relates to electron field emission devices (cold cathodes), vacuum microelectronic devices and field emission displays which incorporate cold cathodes and methods of making and using same. More specifically, the invention relates to cold cathode devices comprising electron emitting structures grown directly onto a growth surface on a substrate material. The invention also relates to patterned precursor substrates for use in fabricating field emission devices and methods of making same and also to catalytically growing other electronic structures, such as films, cones, cylinders, pyramids or the like, directly onto substrates.

2. Description of Related Art

Several publications and patents are referenced in this application within parentheses. These references describe the state of the art to which this invention pertains, and are incorporated herein by references.

Various types of field emitting devices (cold cathodes) have been proposed. Unlike thermal emission devices, which rely on high temperatures to enable a fraction of the free electrons in the emitting material to overcome the barrier of the work function and be emitted, field emission devices rely on a physical phenomenon which has been explained as electrons tunneling from a surface state to a vacuum state when a sufficient electric field is applied to the emitting surface. A typical micro fabricated field emission cold cathode consists of an emitting structure such as a cone with a sharp tip as the electron emitter and an extraction electrode which creates the field that pulls the electrons from the emitting structure. The base of the cone is typically on a conductive surface of the substrate. Usually, the emitting structure is inside a cavity or opening in a dielectric film on the substrate and the extraction electrode is located on top of the dielectric film and proximate to the cavity to produce the field at the emitting surface. The separation between the tip and extraction electrode is on the order of micrometers or less. When the voltage of the extraction electrode is biased sufficiently positively with respect to that of the emitting structure, field emission occurs at the tip without any additional thermal energy.

Some field emission devices are fabricated using technologies developed for microelectronics. The emitter tips are typically fabricated onto a substrate by evaporation, etching or oxidation. Most field emission devices use silicon or molybdenum cones as the electron emitter structures. Field emission devices comprising these cones and also utilizing a gate structure to supply the field potential are usually limited to one emitting tip per gate opening because of the cone structure and methods used for forming these devices.

Manufacture of the cone emitting structures requires sophisticated lithographic and fabrication equipment to form high yield, high-density complex cold cathode structures at low cost. The metal cone emitters are subject to contamination since the surfaces of these cones are reactive. Accordingly, the emitting structures become contaminated in poor vacuums and require cleaning. For example, the metal cone tips become oxidized, and are cleaned by exposing the tips to hydrogen plasma. The metal tip cones also have poor stability of electron emitting yield upon turn-on and require an appreciable "break in" time. Additionally, these materials have high work functions requiring high potentials to attain any given electron emission yield.

An alternative type of cold cathode consists of an electron emitting whisker or fiber, instead of a cone, and an extraction electrode to apply a sufficient electric field to the tip. The tips are made from thin wires (whiskers) of high-melting-point metals, such as tungsten and molybdenum, metal carbides, silicon carbide, or carbon fibers.

Because of the large fiber size and the manufacturing method, these fiber devices typically have large physical dimensions. The electron emitters are first prepared by forming the emitting material into the desired physical geometry, and then mechanically attaching the structure to the substrate. The. separation between the mounted emitter tip and the extraction electrode is on the order of millimeters or larger.

Carbon fibers have been used as field emitting structures. The carbon fibers appear to be more stable than the metal cone structures and do not contaminate easily under normal working conditions. Additionally, certain carbon structures have a low work, function allowing electron emission in low electric fields. Furthermore, carbon fibers also appear to be more robust, i.e. the electron yields over time have a higher stability.

Ex-polymer carbon fibers have been proposed as emitter structures. The ex-polymer carbon fibers are formed from organic precursors. The precursors are extruded into polymeric fibers and the fibers are stabilized by heating in air (200–350° C.), carbonized by heating to about 1000° C., and graphitized by heating to 3000° C. in an inert atmosphere. Among the ex-polymer carbon fibers are PAN fibers which are formed from polyacrylonitrile, a preferred polymeric precursor.

In the above mentioned prior art, the carbon fibers would be formed separately and subsequently attached to the field emission substrate. The prior art carbon fiber emitters typically have diameters of about 7 $\mu$m and are usually first sharpened to decrease the radius curvature of the tips and enhance the electric field. The fibers are then mechanically attached to the field emission device. The distance between the carbon fiber emitter tip and the extraction electrode is usually on the order of at least 1 mm (see, for example, J. J. Lambe, U.S. Pat. No. 4,728,851).

Methods proposed for attaching the carbon fibers include mechanically attaching the fiber by partially melting the surface of the field emitting substrate, inserting the fiber and subsequently cooling the structure to secure the fiber. Another method would utilize an adhesive to glue the fibers onto the surface of the field emitting substrate. The adhesive typically comprises epoxy and/or metallic compositions.

The proposed methods of attaching the fibers are highly disadvantageous since each requires the separate steps of forming the carbon fibers and subsequently attaching the fibers to the field emission substrates. For practical reasons, these methods require the use of large carbon fibers since the attachment requires mechanically handling and manipulating the fibers. Since the size of the fibers is large, these field emitting structures often require "sharpening" of the emitting tips to create a field-enhancing morphology. Not only do the steps of mechanically attaching and sharpening the emitter add cost to the production of the cold cathode, they also limit the ability to fabricate dense emitter patterns.

Fibers that are too small tend to break during handling and are difficult to manipulate. Accordingly, these fiber cathode devices suffer many disadvantages that limit their usefulness.

OBJECTS OF THE INVENTION

It is an object of the present invention to provide cold cathode devices comprising fiber emitters grown onto a substrate material.

It is an additional object of the present invention to provide methods of making a cold cathode device comprising carbon-containing fiber emitters as well as methods of using the same.

It is another object of the present invention to provide field emission devices comprising electron emitting structures having low work functions and high stability of electron emitting yields over time.

It is a further object of the present invention to provide high emitter density cold cathode devices using carbon-containing fiber emitters having diameters less than 1 micron, preferably less than 200 nanometers, grown in situ directly onto the substrate material.

It is another object of the present invention to provide emitting structures that do not contaminate easily under emitting conditions and do not require significant conditioning.

It is yet another object of the present invention to provide a method of using a carbon-containing fiber as an electron emitting structure to take advantage of carbon's low work function, high stability of electron emission over time and resistance to contamination, while at the same time avoiding the disadvantages associated with the field emission devices utilizing carbon fibers that require attachment of the fibers to a substrate.

It is another object of the present invention to provide electron field emission devices (cold cathodes), displays containing electron field emission cathodes and other vacuum microelectronic devices which incorporate carbon-containing fiber cold cathodes.

It is a further object of the present invention to provide patterned substrate materials having catalytic sites on a surface suitable for catalytically growing carbon fibers.

It is a still further object of the present invention to provide methods of making patterned substrate materials having catalytic sites on the surface.

These and other objects, features and advantages of the present invention will be further described and more readily apparent from a review of the detailed description and preferred embodiments which follow.

SUMMARY OF THE INVENTION

The invention in certain aspects relates to cold cathodes for use in electronic devices and displays and methods of making and using cold cathode devices. The present invention in certain embodiments combines the catalysis technology of growing carbon-containing fibers with the technologies developed in the field of microelectronics for the fabrication of field emission devices. Cold cathodes are provided comprising a surface having catalytically grown carbon-containing fibers as robust electron emission sources. According to this aspect of the invention, field emission cathodes are fabricated by selectively depositing a catalyst film on the desired area of a substrate surface, followed by catalytic growth of the carbon-containing fiber emitter structures. Field emission displays are constructed using the carbon-containing fiber-based cold cathodes. The invention also relates to precursor substrates suitable for catalytically growing electron emitter structures. Furthermore, the invention relates to methods of producing other devices and components for such devices using catalytic growth and products produced using those methods such as cold cathode vacuum fluorescent displays.

The present invention will become more fully understood from the detailed description given herein below and the accompanying drawings, which are given by way of illustration only, and thus are not to be considered as limiting the present invention.

BRIEF DESCRIPTION OF THE DRAWINGS

FIG. 9A illustrates a cross-sectional view of a representative schematic of the device. FIG. 9B illustrates a top view of the rows and columns of the device. FIG. 9C illustrates an enlarged view of a portion of FIG. 9B.

FIG. 11A illustrates a cross-sectional view of a representative schematic of the device. FIG. 11B illustrates a view of the emitter rows of the device. FIG. 11C illustrates a view of the phosphor columns of the device.

DETAILED DESCRIPTION OF THE INVENTION

The field emission devices according to the present invention differ from those in the prior art that use carbon fibers as the electron emitting source. The field emitter structures disclosed in this invention are directly grown onto the field emission device substrate in selected areas. Accordingly, the devices can be easily fabricated, the emitter density can be much higher and the distance between emitter tip and extraction electrode can be on the order of micrometers or less, significantly smaller than those mentioned in the prior art.

Carbon fibers can be catalytically produced on a substrate surface if the substrate is at an elevated temperature and a metal catalyst and carbon-containing ambient are present. The basic fabrication process for a field emission device according to the present invention typically involves two major steps: (1) the deposition and, if desired, patterning of a metal catalyst or metal containing compound onto a substrate surface and then (2) heating the substrate in an atmosphere containing a hydrocarbon, carbon-containing compounds and/or carbon monoxide to grow the carbon fiber electron emitters. The catalysts for carbon fiber growth comprise transition metals, selected from the group consisting of Fe, Co, Ni, Cr, Mn, Mo, W, Re, Ru, Os, Rh, Ir, Pd, Pt, Zn and Cu, and preferably iron, nickel, or cobalt or mixtures or alloys of the same.

Figure 1:
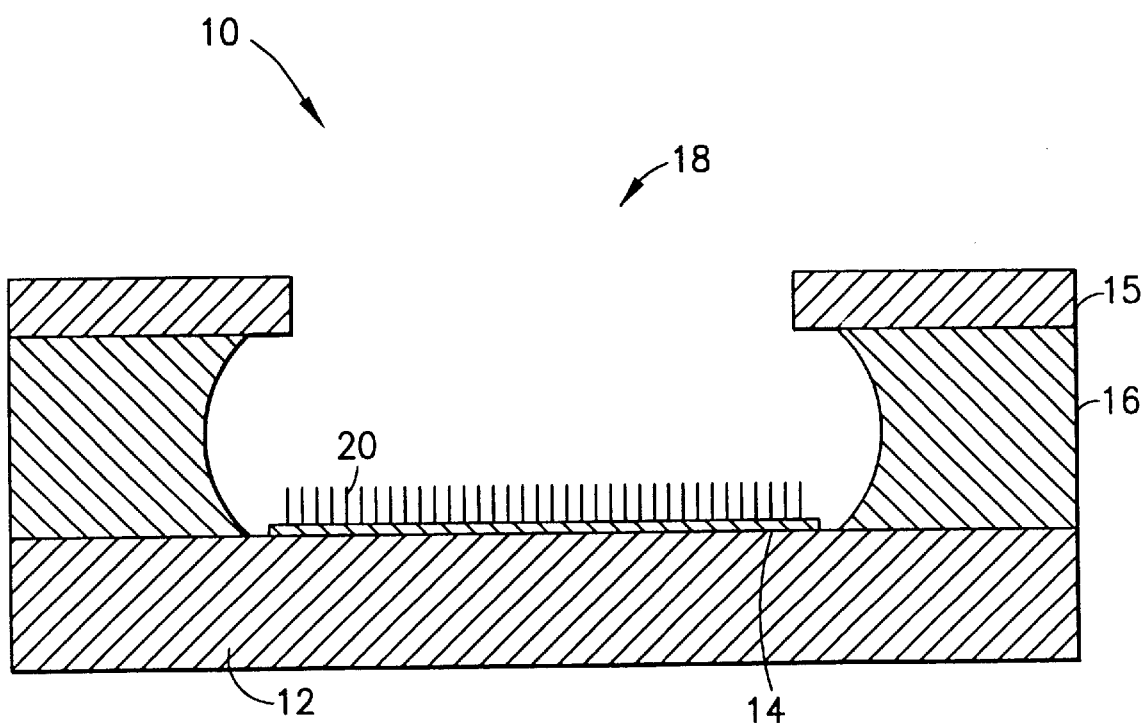
FIG. 1 illustrates a cross-sectional view of a representative schematic of a cold cathode device according to one embodiment of the present invention.

FIG. 1 shows a cross-sectional, schematic view of an embodiment of a cold cathode device 10. The device 10 comprises a substrate 12, a patterned metal catalyst film 14 on the substrate 12 and a patterned gate metal film 15 on a corresponding patterned dielectric film 16 forming gate openings 18. Within the gate openings 18 and formed onto the catalyst metal film 14 are carbon fiber emitters 20.

Figure 2:
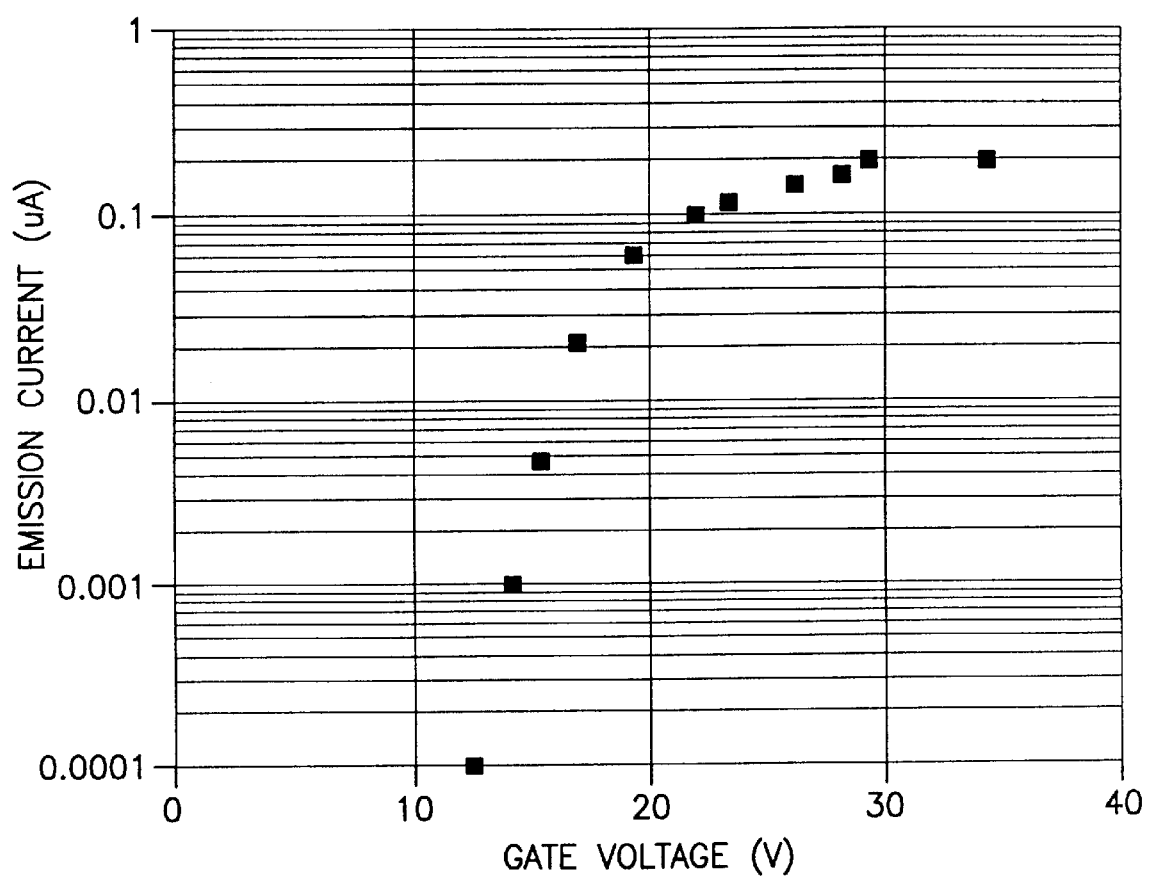
FIG. 2 illustrates a graphical representation of a relationship between emission current and gate voltage for the cold cathode schematically shown in FIG. 1 wherein the vertical axis represents emission current and the horizontal axis represents gate voltage.

FIG. 2 illustrates graphically the relationship between emission current and gate voltage (measured relative to the emitter) for an exemplary cold cathode device in accordance with the embodiment of FIG. 1. The vertical axis represents emission current and the horizontal axis represents gate voltage.

Cold cathodes based on catalytically grown carbon fibers have many additional advantages over other types of cold cathodes. The cold cathodes of the present invention can tolerate poorer vacuums than those cathodes based on metal or semiconductor emitters because of the robustness of the carbon fiber surface. Moreover, since each cathode unit can have many fibers, the cathodes could have significantly increased emission uniformity. In addition, the fabrication of the carbon fiber-based cold cathodes does not require many steps, reducing manufacturing costs. The catalytically grown fibers have intrinsically sharp tips, therefore the macroscopic field required to obtain electron emission from the cathodes is low, typically on the order of 10 volts per micron, further decreasing the cost of an integrated field emission device.

Definitions and Material Considerations

There are a number of terms that are used to describe in detail various aspects of the invention. The term "growth surface" as used in connection with certain embodiments disclosed herein refers to the substrate on which the carbon-containing fiber emitters grow. The carbon-containing fibers are also called carbon fibers in certain embodiments. The growth surface must be suitable for attaching and/or nucleating the carbon fiber. Additionally, the growth surface should be thermally stable under the fiber formation conditions, unless the growth surface comprises the catalyst composition. Therefore it is preferable that the catalyst film does not undergo reactions with the growth surface or substrate that degrade its catalytic activity.

The growth surface may comprise a metal film. The metal film may comprise at least one transition metal or compound or alloy thereof. The transition metal may be selected from the group consisting of Fe, Co, Ni, Cr, Mn, Mo, W, Re, Ru, Os, Rh, Ir, Pd, Pt, Zn and Cu, preferably from subgroup consisting of Fe, Co, Ni, and mixtures or alloys of the same.

The growth surface may also or alternatively comprise a semiconductor or dielectric, however in this case a metal catalyst must be deposited on the growth surface before the growth of carbon fiber emitters.

Preferably, the growth surface is sufficiently conductive to replace electrons lost by the emitter structures due to field emission. Otherwise, the emitter structures will charge, resulting in erratic gain. Accordingly, a means is preferably provided to supply electrons to replenish those that are emitted from the emitter structures. Although conductive, the growth layer may have some resistance to regulate the emission current. Accordingly, a resistor layer may comprise a growth surface. Preferably, the resistor layer has a resistivity of about $10^3$ to about $10^{10}$ ohm-cm. For some embodiments, amorphous silicon carbide incorporating nitrogen as an impurity can be used as the resistor layer. See, for example, U.S. application Ser. No. 08/575,484, entitled "Integrated Circuit Devices and Methods Employing Amorphous Silicon Carbide Resistor Materials", by George R. Brandes, et al., filed concurrently with the present application and presently assigned to the same assignee and hereby incorporated by reference.

The term "substrate" as used in connection with certain embodiments disclosed herein refers to the structure that provides the mechanical support for the electron emitter and is that to which the growth surface (and/or carbon fiber emitters) is attached. The substrate can be a single crystal, polycrystalline, glassy or amorphous material whose surface, in connection with certain other embodiments, may be the growth surface. The substrate may also consist of a mechanical support structure that has deposited on it a monolayer film, a multilayer film, or a structure having a pattern or architecture. The deposited structure or a fraction thereof would form the growth surface. The substrate may comprise at least one material selected from the group consisting of ceramics, metals, glasses, semiconductors, alloys, conductive metals, dielectrics or mixtures thereof. The substrate can be flat, curved or any shape suitable for a field emission device. For example, the substrate may be in the form of a rod with the emitters attached on the outer surface. Such a device would be useful as an electron source that can be inserted into a glass tube having an inner phosphor coating, for example to form a cold cathode vacuum fluorescent light source.

The substrate can comprise one or more layers that may be structured to form an electronic architecture. In particular, an architecture may be constructed which allows each emitting structure or an array of emitting structures to be separately addressable electrically. The substrate can also contain a pattern which is either uniform or non-uniform. The pattern may include contacts formed and leading to the emitting structures. That is, the substrate may include a plurality of current paths on the substrate, each coupled electrically to a respective one or more of the electron emitter structures.

The selection of the materials used in the substrate is based in part on melting or softening temperature and reactivity. Since the growth of the fibers will be at elevated temperatures, it is best to avoid selecting substrate materials that will degrade during the growth of the fibers.

Additionally, it is preferable to avoid selecting materials for the substrate that are reactive. In particular, those portions of the substrate that are to be free of emitting structures should be formed with materials that will not catalyze carbon fibers under normal reaction conditions or react undesirably with other components in the device.

The substrate material must comprise at least one growth surface. The above definition of "substrate" now loosely encompasses a multilayer structure that will always comprise a growth surface. The growth surface can be a continuous or discontinuous surface or layer on the substrate. The growth surface can be uniformly or non-uniformly patterned onto the substrate.

The term "uniform" is used herein to refer to a regularity in structure. For example, a uniform pattern may comprise rows and/or columns of conductive pathways or emitting structures on the surface of a substrate. The term "non-uniform" means lacking such a regular structure. An example of a non-uniform pattern would be the pattern formed by catalyst metal particles after spray deposition onto a substrate. Although the number of particles per unit area does not vary significantly if a large area is considered, over small areas the variation can be significant. The main disadvantage to forming a uniform pattern is that the fabrication cost are typically greater than those incurred when fabricating a random, non-uniform pattern. A non-uniform pattern would be useful, for example, in a cold cathode vacuum fluorescent light source where a uniform pattern of emitting structures is not necessary.

The Catalytic Growth of Carbon Fiber Emitters

The carbon fiber emitters for field emission devices according to the present invention are catalytically grown onto a selected area of the device surface. The method of growing the carbon fibers is to heat the catalyst-containing surface in a gas environment containing hydrocarbons, carbon-containing compounds and/or carbon monoxide.

In general, any transition metal that is a catalyst for the growth of carbon fibers is sufficient for the fabrication of carbon fiber emitters. Examples of catalysts include Fe, Co, Ni, Cr, Mn, Mo, W, Re, Ru, Os, Rh, Ir, Pd, Pt, Cu, Zn, and compounds or alloys containing these elements. The preferred catalysts are Fe, Co, Ni, and mixtures or alloys thereof.

The catalysts can be prepared in different ways and take various forms. One catalyst form is a thick film or even a metal wire, foil or bar. Another form of the catalyst is a very thin metal film deposited on a supporting structure. Yet another form of the catalyst is as particles or compounds deposited on a supporting structure.

The selection of the material for the catalyst support structure is important. The support structure should not degrade the activity of the catalyst. A layer of a semiconductive material works well. A very thin layer of an insulator like an oxide such as silica or alumina is a good choice providing that the oxide is thin enough to be capable of replenishing field emitted charge. In other words, the layer must be thin enough to allow electrons to pass through to the emitters from an underlying conductive or semiconductive layer. For thick films, the emitter structures are grown on the surface of the thick film and the substrate material is less important.

For field emission devices containing patterned emitters, the preferred catalyst form is a thin metal film. The thickness of the catalyst layer in some cases determines the fiber characteristics. The initial thickness of the catalyst film in some cases also influences the density of carbon fiber emitters. For most uses, the catalyst film thickness is preferably less than about 100 microns, more preferably less than 10 microns, even more preferably less than 1 micron and most preferably ranges from about 5 to 200 angstroms.

Patterning of the catalyst metal film can be achieved by several methods. For example, a shadow mask can be used during the evaporation of metal to obtain a desired catalyst pattern. Photolithographic methods can be used to obtain metal catalyst pattern with the pattern size down to less than one micrometer. The preferred patterning method uses photolithography to produce the micron-scale catalyst pattern.

When particles, such as iron oxide particles, are used as catalysts for the growth of carbon fiber emitters, preferably the average diameter of the particle is less than about 3 microns, more preferably less than about 1 micron, even more preferably less than about 0.3 microns, even more preferably less than about 100 nanometers and most preferably less than about 30 nanometers. Smaller catalyst particles are advantageous in that the size of the particle often is related to the diameter of the resultant carbon-containing fiber. This, in turn, can also dictate the emitter structure density on the substrate. Additionally, small particles also catalyze the fibers faster, growing the fibers at a faster rate. This characteristic is particularly beneficial when the other materials used in the field emission device are susceptible to thermal degradation at the reaction temperatures. The ability to grow the carbon fibers faster reduces deleterious thermal degradation of the other materials that may occur at elevated temperatures over extended periods of time.

Most compounds can be used to fabricate the electron emissive structures if they contain a metal element that can catalyze the growth of carbon fibers. For example, inorganic and organometallic compounds of iron, nickel, and cobalt can be used to prepare a catalyst for the growth of carbon fiber emitters. Non-limiting examples of such compounds include (iron, nickel, or cobalt) nitrates, sulfates, chlorides, formates, acetates, oxalates, 2-ethylhexanoates, naphthenates, acetylacetonates, ferrocene derivatives such as ferrocene carboxaldehyde. The methods for applying the catalyst precursors on a substrate include evaporation, sublimation, spin-coating, spraying, printing and painting.

In general, when particles and compounds are used for the catalytic growth of carbon fiber emitters, it is desirable to pre-heat the catalystcontaining surface in a reducing environment like hydrogen before the growing the carbon fiber emitters. This pre-treatment reduces the compounds to fine metallic particles which catalyze the growth of carbon fibers.

The growth of carbon fiber emitters can be achieved by heating a catalyst-containing surface in an environment containing a carbon source. Virtually, any hydrocarbon, carbon-containing compound or carbon-containing compound including carbon monoxide can be used as a carbon source. Non-limiting examples of carbon source include carbon monoxide, methane, ethane, ethylene, acetylene, propane, propylene, butane, butene, butadiene, pentane, pentene, cyclopentadiene, hexane, cyclohexane, benzene, and toluene. The preferred carbon sources are acetylene and ethylene. The pressure of the carbon source can be from one millitorr to several atmospheres, either in pure form or in a carrier gas such as argon and nitrogen. Hydrogen may also be added to the gas stream. Also, the carbon can be deposited as a solid either prior to, simultaneously or after deposition of the catalyst. For example, the carbon source can be residual solvents, photoresist, and/or organometallic compounds which decompose to produce gaseous carbon-containing compounds during heating.

The temperature for the growth of carbon fibers ranges from the decomposition temperature of the carbon-containing compound to the deactivation temperature of the catalyst. In general, this temperature will range from about 300° C. to about 1200° C., preferably from about 500° C. to about 1000° C. When fabricating a field emission device containing carbon fiber emitters, the preferred upper-limit of the emitter growth temperature is in some cases the temperature that the device maintains its structure integrity, typically below about 800° C., and more typically below about 700° C.

The time required for carbon emitter growth depends on both the structure of the field emission device and the growth temperature and pressure. In general, carbon fibers grow at a faster rate at a higher temperature. The growth time should be controlled to achieve the desired length and/or density of carbon fiber emitters. The desired length of the carbon fiber emitters depends on the structure of the field emission device. In general, the growth time ranges from less than one minute to about one hour, preferably from one minute to ten minutes.

The Structures of Carbon Fiber Emitters

The fiber emitters can have a variety of structures and compositions. Preferably, the fiber is a carbon-containing fiber and contains at least 50 atomic percent carbon, more preferably 75 atomic percent carbon, and most preferably more than about 90 atomic percent carbon. The fiber can be a carbide, such as silicon carbide. Additionally, the fiber can contain portions of the catalyst, for example, the fiber may contain at least one transition metal or compound or alloy thereof. The transition metal compound may be selected from the group consisting of Fe, Co, Ni, Cr, Mn, Mo, W, Re, Ru, Os, Rh, Ir, Pd, Pt, Zn, and Cu. Additionally, the carbon may contain hydrogen or other reactive moieties, particularly at the surface and/or tip of the fiber.

The fiber structures can have various morphologies. The fibers include single wall or multiple-walled tubular structures. These fibers can also be graphitic, single crystal or polycrystalline. Various types of catalytically grown fibers can be produced. Straight fibers are grown at high temperatures, whereas vermicular fibers (i.e., with an irregular twisting structure) are usually produced at lower temperatures below about 900° C., although straight fibers can also be grown at these low temperatures. The vermicular fibers tend to have an amorphous structure whereas the straighter fibers are more graphitic. It is noteworthy that the diameter of the resulting fiber is usually closely related to the diameter of the particles catalyzing the fiber growth.

Preferably the resultant carbon fiber emitters have an average diameter less than about 2–10 microns, more preferably less than about 1 micron, even more preferably less than about 0.5 microns, and most preferably in the range from about 20 nanometers to about 200 nanometers. Additionally, the fiber preferably has a small radius at the electron emitting tip to enhance the electric field. Moreover, the fiber preferably has an aspect ratio (height over width) greater than about 2, more preferably greater than about 4.

The Fabrication of Micro Field Emission Devices Containing Carbon Fiber Emitters The fabrication of a micro field emission device containing carbon fiber emitters according to the present invention combines semiconductor processing technology with catalytic carbon fiber growth technology. A non-limiting general procedure for fabricating a micro field emission device involves the following processes: fabricating the basic structure of the device using semiconductor processing techniques, depositing a metal catalyst on the desired area of the device using semiconductor processing techniques, and heating the device in a gas environment containing a carbon source to grow carbon fiber emitters.

A typical field emission device comprises at least one electron emitter structure and a gate electrode to produce the electron-extracting electric field. The overall criteria for the selection of the gate electrode is process compatibility. The gate metal should be stable at the elevated temperatures used for the emitter growth. It should also only catalyze carbon fiber growth at a negligible rate compared to the carbon fiber growth catalyzed by the selected catalyst. For example, when iron is used as a catalyst to grow the emitter, molybdenum or tungsten can be used as a gate metal since the catalytic properties of molybdenum or tungsten are much lower than that of iron. Accordingly, the use of such a combination results in significant fiber growth on the iron surface while avoiding deleterious fiber growth on the gate metal. Non-limiting examples of gate electrodes include W, Mo, Al, Cr, Pt, Au, Ag, Cu, polysilicon, silicides and mixtures thereof.

DESCRIPTION OF PREFERRED EMBODIMENTS

According to one embodiment of the invention, a field emission device is produced comprising a substrate and a plurality of electron emitter structures comprising carbon-containing fibers attached to a growth surface of the substrate. Preferably, the carbon-containing fibers are grown catalytically on the growth surface.

Preferably, portions of the growth surface have an electron emitter structure density greater than about 0.1 electron emitter structures per square micron. The greater the electron emitter density, the more uniform the electron emission. Emission uniformity is important in a field emission display containing the cold cathode.

The device may further comprise a gate structure for controlling the application of electric fields to the electron emitter structure. The gate structure may comprise an electrode with a gate opening having a width in the range about 0.2–10 microns, preferably in the range about 0.5–5 microns. The device may be constructed so that the distance between at least one of the emitter ends and the gate opening is less than about 5 microns, preferably less than 1 micrometer.

The field emission device may comprise a single emitter structure or a plurality of electron emitter structures arranged on the growth surface. The device may comprise a plurality of electrically isolated regions, each having at least one electron emitter structure and structures which serve to supply electric current to the electron emitter structures sufficient to replenish field emitted charge. Preferably, the plurality of electron emitter structures are arranged as a plurality of field emission cathode regions each having a plurality of electron emitter structures, the plurality of field emission cathode regions being spaced apart on the substrate.

The structures which supply electric current may comprise a plurality of row electrodes forming portions of the growth surface on which the electron emitter structures of the plurality of field emission cathode regions are formed, the plurality of field emission cathode regions can be arranged as a plurality of row electrodes, and the plurality of gate electrodes arranged in a plurality of columns with respect to the plurality of field emission cathode regions. A resistive layer for homogenizing the electron emission may be present, in a series electrical connections between the row electrode and electron emitter.

The device may further comprise a dielectric region formed on the substrate, the dielectric region having a plurality of apertures (gate openings) there through defining the field emission cathode regions and a plurality of gate electrodes formed on a surface of the dielectric region opposite the substrate.

The methods of making the field emission devices involve growing at least one carbon-containing fiber catalytically on a growth surface of a substrate by heating the substrate in the presence of carbon to a temperature sufficient to grow the carbon-containing fiber on the growth surface. Preferably, the heating is carried out at a temperature from about 350° C. to about 1200° C. in a carbon-containing gas, more preferably at a temperature from about 500° C. to 800° C.

The carbon-containing gas can be selected from the group consisting of hydrocarbons, carbon-containing compounds and carbon monoxide.

Preferably, the method may further comprise the use of a catalyst comprising at least one transition metal. The transition metal may be selected from the group consisting of Fe, Co, Ni, Cr, Mn, Mo, W, Re, Ru, Os, Rh, Ir, Pd, Pt, Zn and Cu, and mixtures or alloys thereof, and preferably from the subgroup consisting of Fe, Co, Ni, and mixtures or alloys thereof. Alternatively, the catalyst can be a compound comprising at least one transition metal selected from the group consisting of Fe, Co, Ni, Cr, Mn, Mo, W, Re, Ru, Os, Rh, Ir, Pd, Pt, Zn, and Cu, and preferably from the subgroup consisting of Fe, Co, Ni, and mixtures or alloys thereof. According to one embodiment of the invention, the catalyst comprises $Fe_2O_3$.

The catalyst can be in the form of a catalyst metal or metal compound film, preferably having a thickness less than about 1 micron. Alternatively, the catalyst can be in the form of catalyst particles, preferably having an average diameter less than about 200 nanometers.

The fibers may be grown in the presence of a magnetic or electric field. The fields assist in growing straighter fibers by pulling the catalyst particle in one direction, preferably in a direction perpendicular or substantially perpendicular to the growth surface.

Various methods can be used to produce the cold cathode device according to the invention.

One embodiment of the invention involves the fabrication of a cathode device comprising the steps: (1) dissolving the catalyst compound in a solution containing a high concentration of carbon, (2) dispersing the solution on a substrate surface and spinning the substrate to form a uniform thin film on the substrate surface, and (3) rapidly thermally annealing at temperatures in the range 400–1100° C. for times on the order of a few seconds to several minutes in a reducing environment such as 5% $H_2$ in $N_2$. During the thermal annealing process, the catalyst compound is reduced into very fine metal particles, which catalyze the growth of carbon fibers on the substrate surface. The carbon is not externally supplied, but is rather produced from the decomposition of the catalyst compound and the residual solvents. However, an additional hydrocarbon source, such as methane, may be provided during the rapid thermal annealing.

Patterned field emitters on a substrate surface have been fabricated by combining catalysis technology with micro fabrication technologies. The process typically involves depositing the catalyst on a surface in a patterned fashion, and then growing electron emitters by heating the substrate in an atmosphere containing a carbon source.

Several methods can be used to deposit catalysts on a substrate surface in a patterned fashion.

When a metal film is used as the catalyst, the metal film can be patterned on a substrate surface by several methods. Non-limiting examples include: (1) using a shadow mask during metal evaporation, (2) a lift-off process where the substrate surface is first defined with a photoresist pattern followed by metal evaporation and lift-off, or (3) etching where the substrate is first deposited with a uniform metal film followed by photoresist pattern definition and etching.

When compounds or ultrafine particles or colloids are used as catalysts, the catalysts may also be patterned on the substrate surface using the following steps: (1) thoroughly mixing the catalyst with a photoresist and optionally with an additional solvent, (2) dispersing the catalyst-containing photoresist on a substrate surface and spinning the substrate to form a uniform thin film on the substrate surface, (3) exposing the substrate to UV light through a pattern-defining photomask, and (4) developing the photoresist to produce a pattern containing the catalyst on the substrate surface. The resultant substrate is suitable and ready for the catalytic growth of carbon-containing fibers.

The use of a metal catalyst film is a preferred approach. The patterns are easy to form, uniform, and accurate with high reproducibility when a metal film is used. After a catalyst pattern is defined on a substrate surface, the patterned electron emitters are fabricated by further heating the substrate in an atmosphere containing a carbon source.

Preferably in each of the methods, the growth surface is capable of replenishing field emitted charge. The growth surface may also be a resistor layer.

Another embodiment of the inventive method comprises the steps of forming a patterned catalyst film on the growth surface; forming a patterned dielectric film on the catalyst film; forming a patterned gate metal film on and corresponding to the patterned dielectric film; and heating the substrate in the presence of a carbon source to a temperature sufficient to grow the electron emitter structure comprising the carbon-containing fiber on the exposed portions of the growth surface.

Another embodiment comprises forming a patterned dielectric film on the growth surface; forming a patterned gate metal film on and corresponding to the patterned dielectric film; forming a catalyst film on exposed portions of the growth surface; and heating the substrate in the presence of a carbon source to a temperature sufficient to grow electron emitter structures on the exposed portions of the growth surface. Preferably, the growth surface is capable of replenishing field emitted charge and may be a resistor layer.

Still another embodiment comprises forming a patterned dielectric film on the growth surface; forming a patterned gate metal film on and corresponding to the patterned dielectric film thereby forming gate openings; forming a catalyst film on exposed portions of the growth surface thereby creating catalytic sites aligned in the center of the gate openings; heating the substrate in the presence of a carbon source to a temperature sufficient to grow electron emitters comprising carbon-containing fibers on the growth surface.

A still further embodiment comprises forming a patterned dielectric film on a surface of the substrate; forming a patterned gate metal film on and corresponding to the patterned dielectric film thereby forming gate openings; forming the growth surface which comprises a patterned resistor composition film on and corresponding to exposed portions of the surface of the substrate; forming a catalyst film on the growth surface through the gate openings; and heating the substrate in the presence of a carbon source to a temperature sufficient to grow the electron emitters on the growth surface.

A still further embodiment comprises depositing a dielectric film on the growth surface; depositing a gate metal film on the dielectric film; depositing a photoresist film composition on the gate metal film; exposing the photoresist film to a pattern of radiation; developing the photoresist material to produce a pattern corresponding to the pattern of radiation thereby forming exposed portions of the gate metal film; removing the exposed portions of the gate metal film thereby forming gate openings and exposed portions of the dielectric film; removing the exposed portions of the dielectric film thereby forming exposed portions of the growth surface; depositing a catalyst film on the exposed portions of the growth surface or fraction thereof; and heating the substrate in the presence of a carbon source to a temperature sufficient to grow electron emitter structures comprising carbon-containing fibers on the growth surface.

Another method comprises the steps of forming a patterned dielectric film on the growth surface; forming a patterned gate metal film on and corresponding to the patterned dielectric film; forming a patterned photoresist film composition on the patterned gate metal film; depositing a catalyst film on the exposed portions of the growth surface and patterned photoresist film; removing the patterned photoresist film and corresponding portions of the catalytic film; and heating the substrate in the presence of a carbon source to a temperature sufficient to grow electron emitter structures on the growth surface.

Alternatively, the method comprises depositing a dielectric film on the growth surface; depositing a gate metal film on the dielectric film; forming a patterned photoresist film composition on the gate metal film; removing portions of the gate metal film thereby forming gate openings corresponding to the patterned photoresist film; removing portions of the dielectric film thereby forming exposed portions of the growth surface corresponding to the patterned photoresist film; depositing a second photoresist composition film; exposing the second photoresist film to a pattern of radiation defining catalytic site openings aligned in the center of the gate openings; depositing a catalyst film on the exposed portions of the growth surface through the catalytic site openings; removing the second patterned photoresist film; and heating the substrate in the presence of a carbon source to a temperature sufficient to grow electron emitters comprising carbon fibers on the growth surface within the catalytic site openings.

Yet another alternative method comprises depositing a dielectric film on a surface of the substrate; depositing a gate metal film on the dielectric film; depositing a patterned photoresist film composition on the gate metal film; removing portions of the gate metal film thereby forming gate openings corresponding to the patterned photoresist film; removing portions of the dielectric film thereby forming exposed portions of the surface of the substrate corresponding to the patterned photoresist film; depositing the growth surface on the exposed portions of the surface; depositing a catalyst film on the growth surface through the catalytic site openings; removing the patterned photoresist film along with corresponding portions of the growth surface and catalyst film; and heating the substrate in the presence of a carbon source to a temperature sufficient to grow the electron emitters on the growth surface within the catalytic site openings.

Another method comprises depositing a catalyst film on the growth surface; depositing a dielectric film on the catalyst film; depositing a gate metal film on the dielectric film; depositing a photoresist film composition on the gate metal film; exposing the photoresist film to a pattern of radiation; developing the photoresist material to produce a pattern corresponding to the pattern of radiation thereby forming exposed portions of the gate metal film; removing the exposed portions of the gate metal film thereby forming exposed portions of the dielectric film and gate openings; removing the exposed portions of the dielectric film thereby forming exposed portions of the catalyst film; and heating the substrate in the presence of a carbon source to a temperature sufficient to grow electron emitter structures comprising the carbon-containing fibers on the growth surface.

According to another aspect of the invention, a composite device is constructed utilizing catalytic growth to form an electronic structure such as a film, pyramid, cones, cylinders or the like. The method comprises growing at least one structure comprising a source material catalytically on a growth surface of a substrate by heating the substrate in the presence of a catalyst and a precursor composition comprising the source material to a temperature sufficient to grow the structure on the growth surface. Preferably, the catalyst is a patterned film on the growth surface of the substrate. The grown structure can be a film, a cone structure or the like.

Another aspect of the invention relates to a field emission precursor substrate that is suitable for catalytically growing electron emitter structures comprising carbon-containing fibers. The precursor substrate may comprise a substrate material and a catalyst comprising at least one transition metal, wherein the catalyst is in the form of a catalyst film in contact with the growth surface of the substrate. The growth surface may comprise a resistor film. The field emission precursor substrate may further comprise a patterned dielectric film and/or a patterned conductive metal film.

Optionally, the catalyst film may comprise a plurality of catalytic sites spaced apart on the growth surface and arranged in a pattern thereon. Preferably, the precursor substrate comprises a dielectric region formed on the substrate, the dielectric region having a plurality of apertures there through defining the catalytic sites on the growth surface and a plurality of gate electrodes formed on a surface of the dielectric region opposite the growth surface. Even more preferably, the precursor substrate comprises a structure for supplying electric current to the catalytic sites. Preferably, the structure for supplying electric current comprises a plurality of row electrodes forming portions of the substrate and the catalytic sites are arranged in a rectangular pattern on the plurality of row electrodes, and a plurality of gate electrodes arranged in a plurality of columns with respect to the rectangular pattern of the plurality of catalytic sites.

Still another aspect of the invention comprises a method of emitting electrons from a field emission device by providing a field emission device comprising a substrate and at least one electron emitter structure comprising a carbon-containing fiber catalytically grown on a surface of the substrate and applying an electric field such that electrons are emitted from the carbon-containing fiber. Preferably, the method further comprises providing an electrode opposite the carbon-containing fiber, more preferably providing a phosphor plate opposite the carbon-containing fiber to receive the electrons and emit light.

The cavity or space where the electrons are expected to travel should be maintained under vacuum. The mean free path of the electron is determined by a number of factors including the pressure, and electron energy. Decreasing the pressure increases the mean free path of the electrons, which allows the electrons to travel greater distances without collisions. Accordingly, lower pressures during operation are preferred. In most instances, the pressure should be less than about $10^{-3}$ Torr, preferably less than about $10^{-4}$ Torr, more preferably less than about $10^{-5}$ Torr and most preferably less than about $10^{-6}$ Torr.

The invention also relates to various apparatus and devices incorporating the cold cathodes, including field emission displays, vacuum transistors that have a vacuum collector region that permits ballistic transport, electron microscopes, spectrometers, sensors, ion-gauges, air purifiers, low information content display devices, cold cathode vacuum fluorescent light sources, traveling wave tubes and other microwave tubes.

As stated above, several methods have been developed combining our novel emitter technology with micro fabrication technologies to produce the field emission cold cathodes. In general, the fabrication of a cold cathode can be divided into three tasks: developing the basic structure of the device, depositing the catalyst film on the desired area of the device and growing carbon-containing fiber emitters on the device. The order of the first two tasks varies; growing the fibers is typically the final step.

Some of the various methods of manufacturing the cathode devices are set forth below.

Figure 3A:
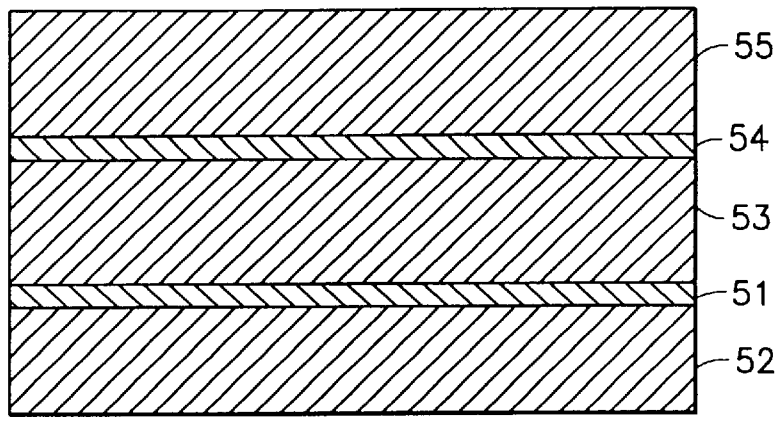
FIGS. 3A–3D show cross-sectional views of successive stages of field emitter device fabrication in accordance with one embodiment of the present invention.
Figure 3B:
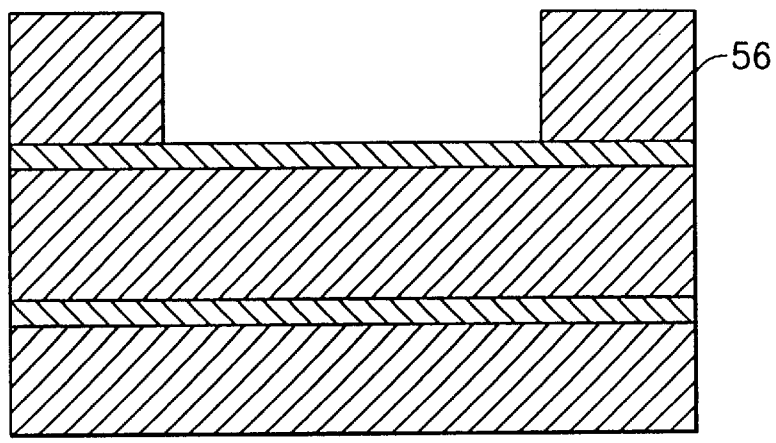
Figure 3C:
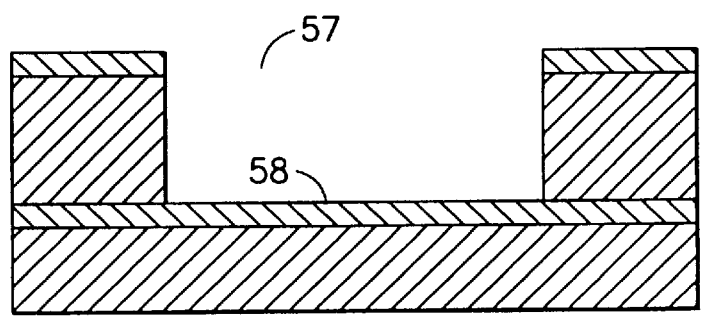
Figure 3D:
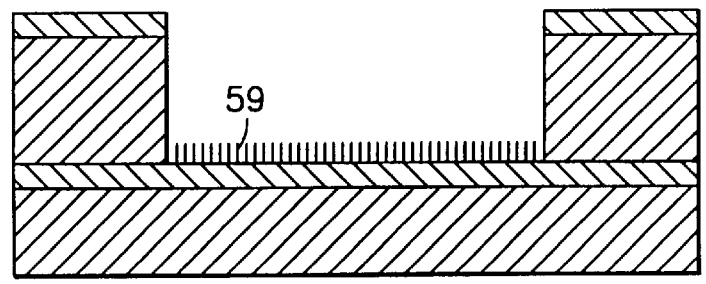

Method I. FIGS. 3A–3D show cross-sectional schematic views of successive major stages of this method of fabricating a cold cathode device. FIG. 3D shows a schematic of one type of field emission cold cathode. This type of cathode can be fabricated by following steps: (1) depositing a metal catalyst film 51 on a substrate 52; (2) depositing a dielectric film 53 on the catalyst film 51, (3) depositing a gate metal film 54 on the dielectric film 53, (4) depositing photoresist 55 on the gate metal film 54 and defining a photoresist pattern 56 using photolithography, (5) etching the gate metal to produce a gate opening 57, (6) etching the dielectric to expose a portion 58 of the metal catalyst film 51, and (7) heating in an atmosphere containing a carbon source to grow carbon emitters 59 on the exposed metal film inside the gate openings. The gate metal should be selected to discourage growth of carbon fibers thereon at the emitter growth conditions.

In this method, the metal catalyst film acts both as the catalyst for the carbon fiber growth and as the conductor to supply electrons to the carbon emitters if sufficiently thick. If the catalyst film is very thin it should break apart into particles upon heating and the fibers will grow directly onto the substrate surface. An advantage of this method is its simplicity; it only requires one photolithographic process.

Method II. FIGS. 4A–4D shows a schematic of another field emission cathode and the major fabrication steps. The cathode has been fabricated by the following steps: (1) depositing a dielectric film 71 on a conducting or semiconducting substrate 72, or an insulating substrate covered with a conductive film in a patterned fashion, (2) depositing a gate metal film 73 which will form an alloy 79 with the catalyst metal during heating and which does not catalyze carbon fiber growth, (3) defining a photoresist pattern 74, (4) etching the gate metal to produce a gate opening 75, (5) etching the dielectric to expose the substrate, with an intentional undercut 76 in the dielectric, (6) depositing a metal catalyst film 77, and (7) heating in an atmosphere containing a carbon source to grow carbon emitters 78 on the exposed substrate inside of the gate openings. During heating, the metal catalyst on top of the gate metal dissolves into the gate metal and does not readily catalyze the formation of carbon fibers on the gate metal.

Figure 4A:
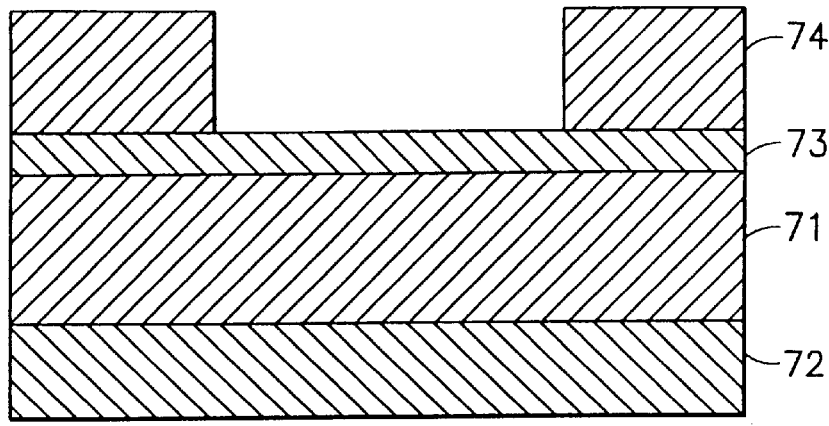
FIGS. 4A–4D show cross-sectional views of successive stages of fabricating a field emitter device in accordance with another embodiment of the present invention.
Figure 4B:
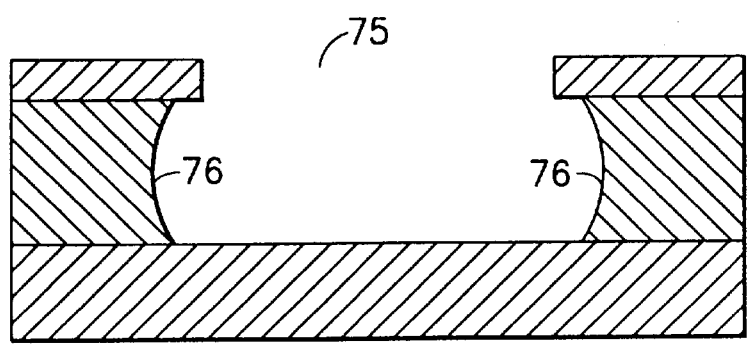
Figure 4C:
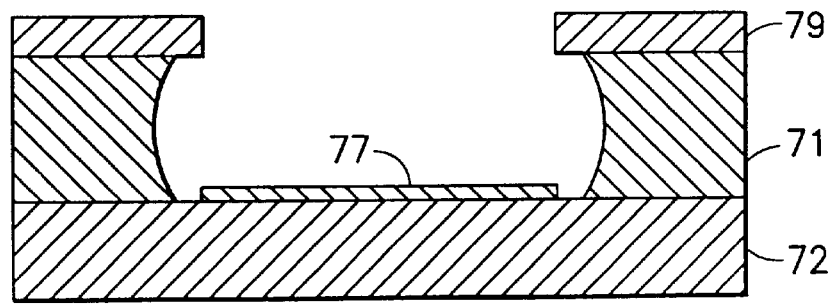
Figure 4D:
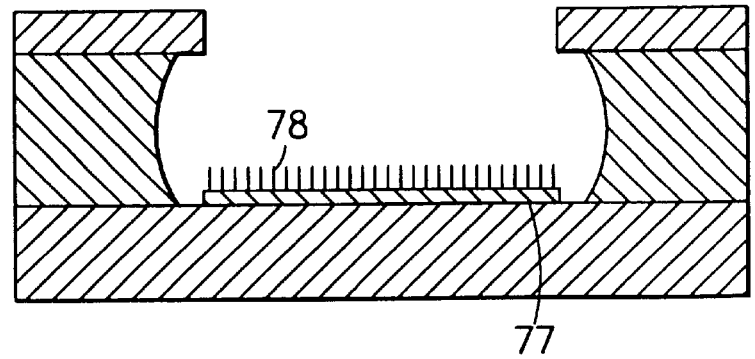
Figure 5A:
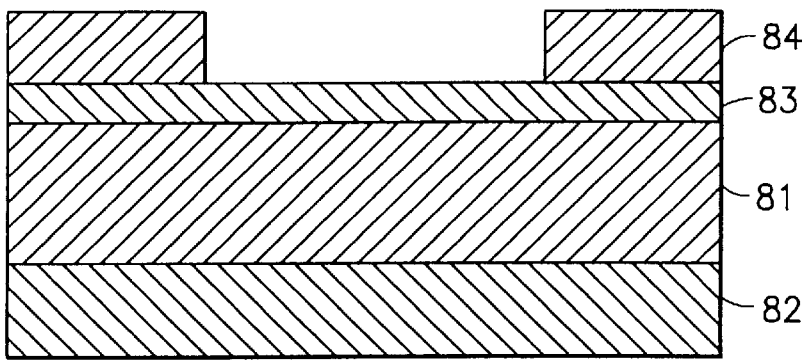
FIGS. 5A–5D show cross-sectional views of successive stages of fabricating a field emitter device in accordance with another embodiment of the present invention.
Figure 5B:
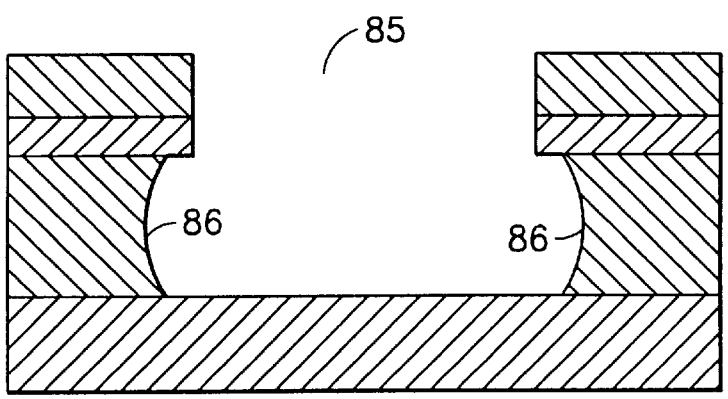
Figure 5C:
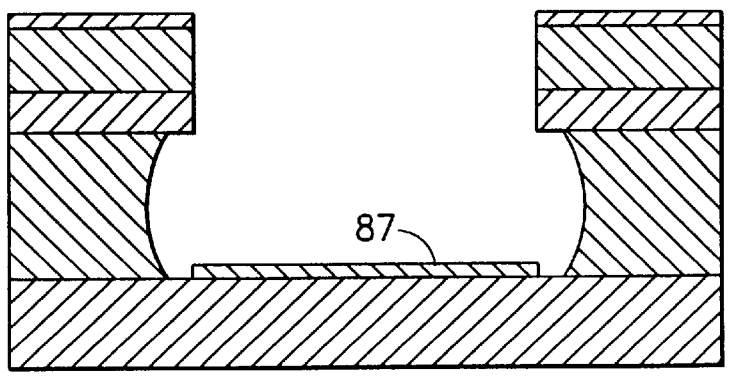
Figure 5D:
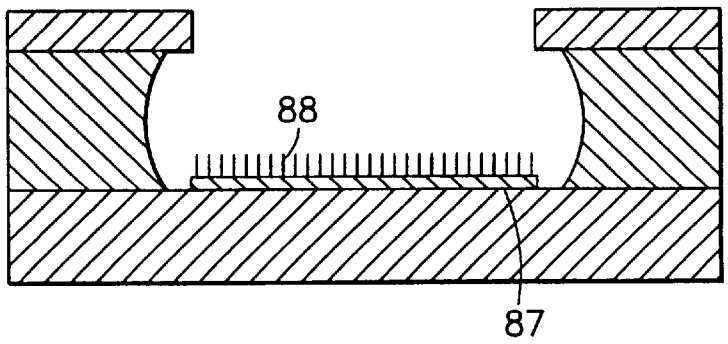

Field emission properties of the cathodes shown in FIG. 4D have been measured. During the measurement, an auxiliary phosphor plate was hung above the cathode in a high vacuum chamber of $10^{-7}$ Torr to collect the electrons emitted from the cold cathode when a positive voltage was applied to the gate metal with respect to the conductive/semiconductive substrate. FIG. 2 shows the I–V characteristics for the cathode. Electron emission is observed at a gate voltage of less than 15 V. The transition of emission from off to fully on takes place over a range of about 10 V. This is compared to cold cathodes made from molybdenum cones which turn on emission at a much higher voltage of about 50 V (C. A Spindt et. al., *J. Vac. Sci. Technol.*, Vol. 11, 1993. pages 468–473).

Method III. FIGS. 5A–5D shows still another processing procedure for fabricating a cathode having a structure similar to that of method II. The major process steps are: (1) depositing a dielectric film 81 on a conducting or semiconducting substrate 82, or an insulating substrate covered with a conductive film in a patterned fashion, (2) depositing a gate metal film 83, (3) defining a photoresist pattern 84, (4) etching the gate metal to produce a gate opening 85, and still keeping the photoresist pattern, (5) etching the dielectric to expose the substrate with an intentional undercut 86 in the dielectric while still keeping the photoresist on top of the gate metal, (6) depositing a metal catalyst film 87, (7) lift-off the remaining photoresist along with the catalyst film on top of the photoresist, and (8) heating in an atmosphere containing a carbon source to grow carbon-containing emitters 88 on the exposed substrate inside of the gate openings 85.

The main difference between method III and method II is that method III avoids the deposition of catalyst film on the gate metal, allowing more flexibility in choosing both the catalyst and the gate metal.

A slight variation of this method is that during etching of the gate metal, the gate metal is intentionally over-etched so that the size of gate opening 85 is slightly larger than the size of photoresist opening 84. In this way, the final electron emitters will be located in the center region of gate opening which reduces current leakage between the gate and the emitter substrate.

Figure 6A:
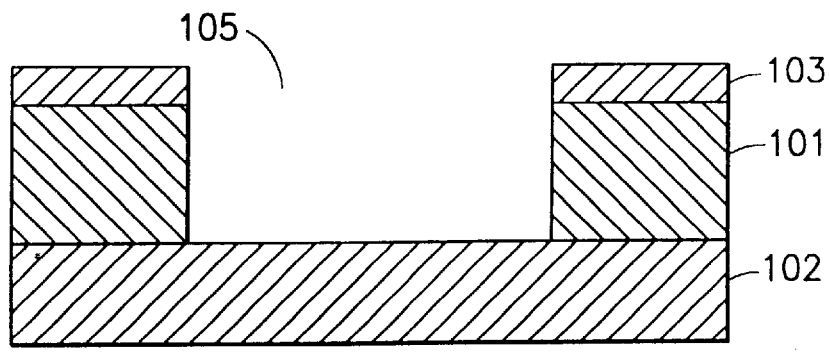
FIGS. 6A–6D show cross-sectional views of successive stages of fabricating a field emitter device in accordance with another embodiment of the present invention.
Figure 6B:
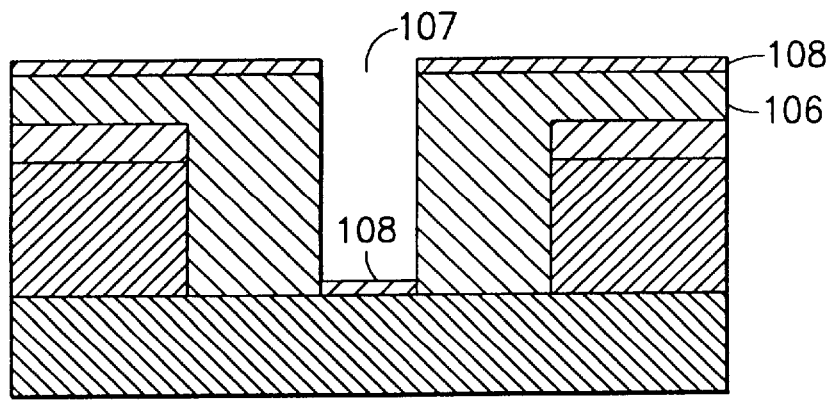
Figure 6C:
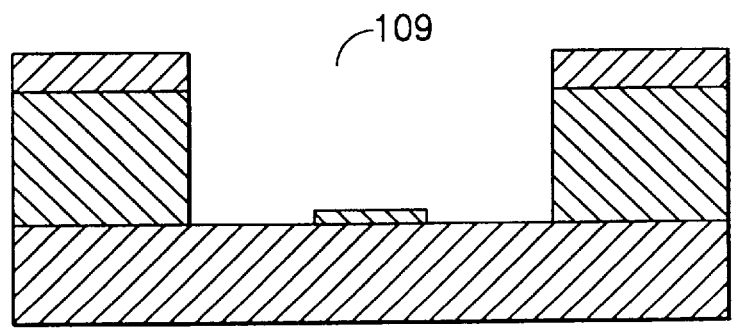
Figure 6D:
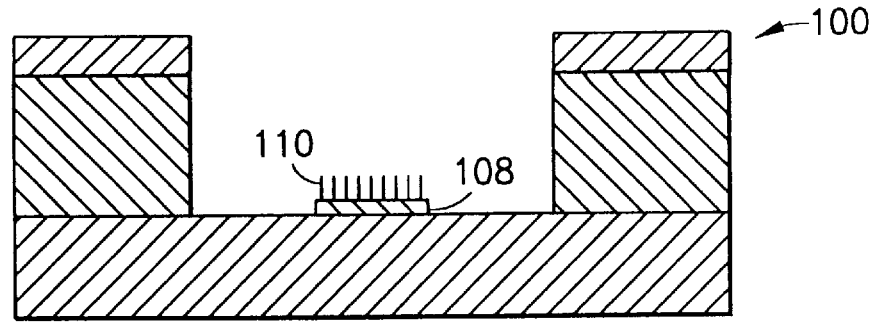

Method IV. FIGS. 6A–6D show cross-sectional schematic views of successive major stages of fabricating a field emitter device in accordance with one embodiment of the present invention. FIG. 6D shows a schematic of cold cathode 100. The fabrication of this type of cold cathode involves two photolithographic processes. The major fabrication steps are: (1) depositing a dielectric film 101 on a conducting or semiconducting substrate 102, or an insulating substrate covered with a conducting film in a patterned fashion, (2) depositing a gate metal film 103, (3) defining a photoresist pattern, (4) etching the gate metal to produce a gate opening 105, (5) etching the dielectric to expose the substrate, (6) coating the entire surface with photoresist and photolithographically defining a second pattern 106 which yields smaller holes 107 in the photoresist layer and the second pattern is aligned so that the holes in the photoresist are in the center of the gate opening 105, (7) depositing a metal catalyst film 108, (8) lift-off the remaining photoresist along with the catalyst film on top of the photoresist so that catalyst film is present on the substrate inside the gate opening and only on the center part of the gate opening 109, and (9) heating in an atmosphere containing a carbon source to grow carbon emitters 110 in the center of the gate openings.

This method uses two photolithographic steps, requiring a good alignment. An advantage of this method is that electron emitters are in the center of the gate opening, which reduces current leakage between the gate and the emitter substrate. It also reduces the divergence of the electron beam.

Figure 7A:
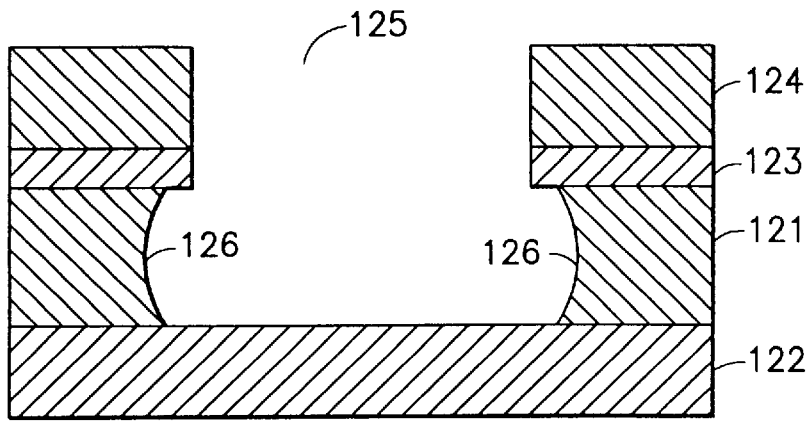
FIGS. 7A–7D show cross-sectional views of successive stages of fabricating a field emitter device in accordance with another embodiment of the present invention.
Figure 7B:
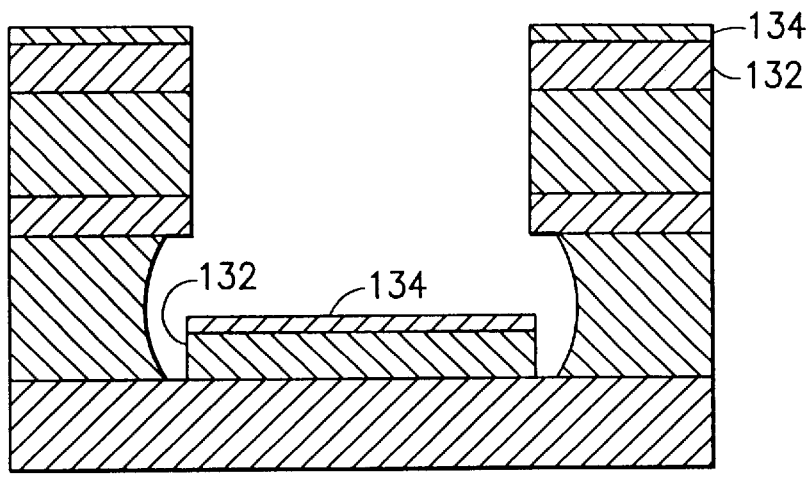
Figure 7C:
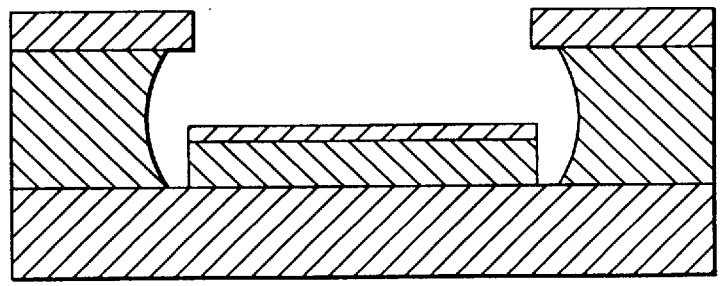
Figure 7D:
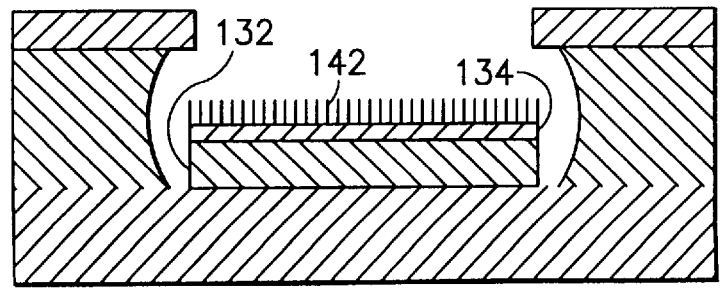

Method V. FIGS. 7A–7D show cross-sectional schematic views of successive major stages of fabricating a field emitter device in accordance with another embodiment of the invention. FIG. 7D shows a schematic of a cold cathode with a resistor layer that limits the emission current. The major fabrication steps include: (1) depositing a dielectric film 121 on a conducting or semiconducting substrate 122, or an insulating substrate covered with a conductive film in a patterned fashion, (2) depositing a gate metal film 123, (3) defining a photoresist pattern 124, (4) etching the gate metal to produce a gate opening 125 without removing the photoresist pattern 124, (5) etching the dielectric film 121 to expose the substrate with an intentional undercut 126 in the dielectric while still keeping the photoresist on top of the gate metal, (6) depositing a resistor layer 132, (7) depositing metal catalyst film 134, (8) lift-off the remaining photoresist along with a portion of the resistor layer and a portion of the catalyst film on top of the photoresist, and (9) heating in an atmosphere containing a carbon source to grow carbon-containing emitters 142 inside of the gate openings 125.

This type of cathode may have a resistor layer 132 between the carbon fiber 142 emitters and the substrate 122. The resistor layer limits the emission current of unusually good emitting sites, improving the uniformity of the emission.

A slight variation of this method is that during etching of the gate metal, the gate metal is intentionally over-etched so that the size of gate opening 125 is slightly larger than the size of photoresist opening 124. In this way, the final electron emitters will be located in the center region of gate opening which reduces current leakage between the gate and the emitter substrate.

Figure 8A:
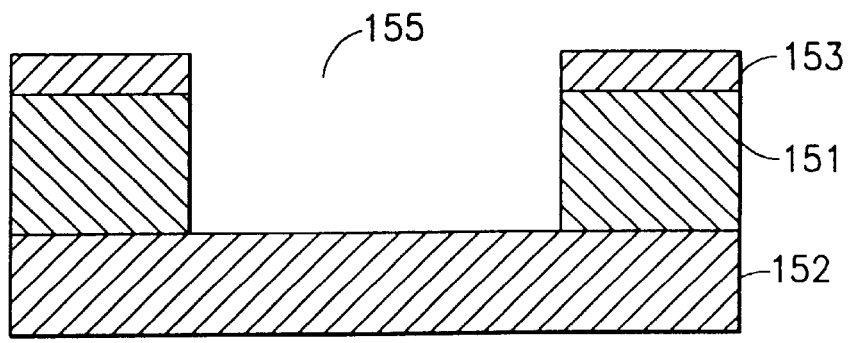
FIGS. 8A–8D show cross-sectional views of successive stages of fabricating a field emitter device in accordance with another embodiment of the present invention.
Figure 8B:
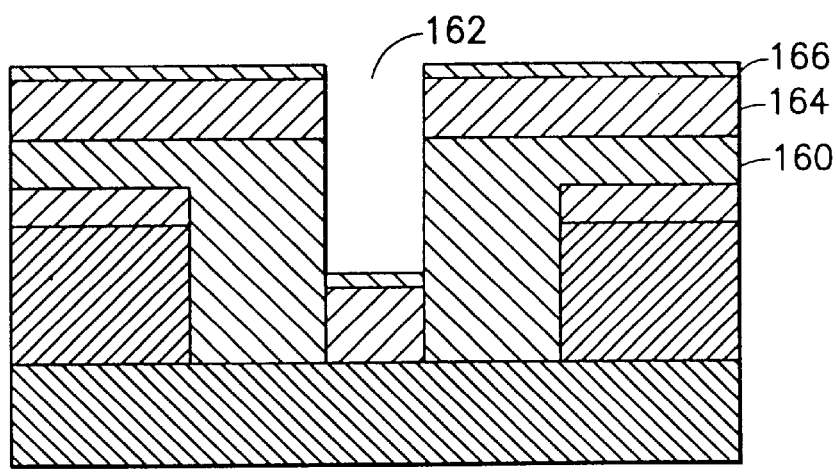
Figure 8C:
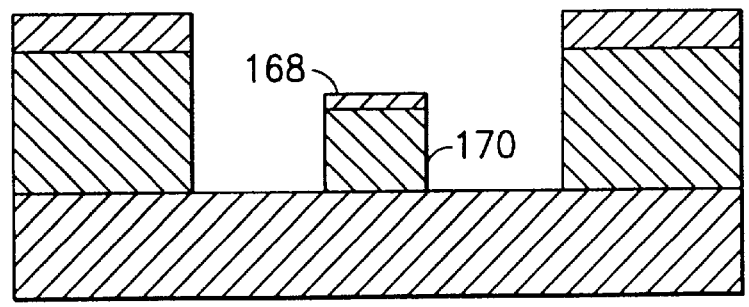
Figure 8D:
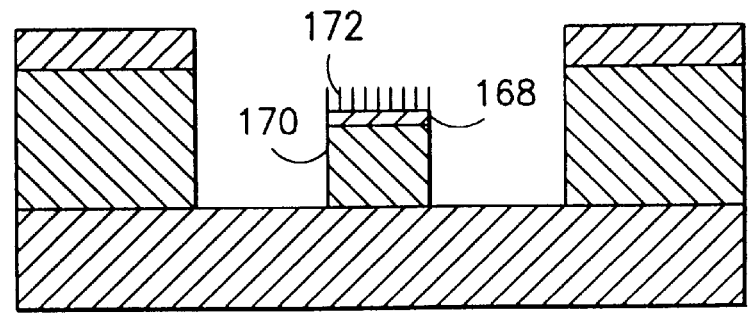

Method VI. FIGS. 8A–8D show cross-sectional schematic views of successive major stages of fabricating a field emitter device in accordance with another embodiment of the invention. FIG. 8D shows a schematic of a cold cathode with a resistor layer. The fabrication of this type of cold cathode involves two photolithographic processes. The major fabrication steps are: (1) depositing a dielectric film 151 on a conducting or semiconducting substrate 152, or an insulating substrate covered with a conducting film in a patterned fashion, (2) depositing a gate metal film 153, (3) defining a photoresist pattern, (4) etching the gate metal to produce a gate opening 155, (5) etching the dielectric to expose the substrate, (6) coating the entire surface with photoresist and photolithographically defining a second pattern 160 which yields smaller holes 162 in the photoresist layer and the second pattern is aligned so that the holes 162 in the photoresist are in the center of the gate opening 155, (7) depositing resistor layer 164, (8) depositing metal catalyst film 166, (9) lift-off the remaining photoresist along with a portion of the resistor layer and a portion of the catalyst film on top of the photoresist so that the remaining catalyst film 168 and the remaining resistor 170 are present on the substrate inside the gate opening 155 and only on the center part of the gate opening 155, and (10) heating in an atmosphere containing a carbon source to grow carbon emitters 172 in the center of the gate openings.

An advantage of this method is that electron emitters are in the center of the gate opening, which reduces leakage current between the gate and the emitter substrate. It also reduces the divergence of the electron beam. The resistor layer improves the uniformity of the electron emission.

Matrix addressable cold cathodes have been fabricated by combining the disclosed emitter growth technology with device fabrication technologies. A matrix addressable cathode array includes many pixels wherein each pixel is addressed by applying voltages to the corresponding row and column electrode. The column electrode may correspond to the gate metal of the cold cathodes and the row electrode may correspond to the conductor on which the carbon fiber emitters have grown. Each pixel further includes one of more field emission cold cathodes.

Figure 9A:
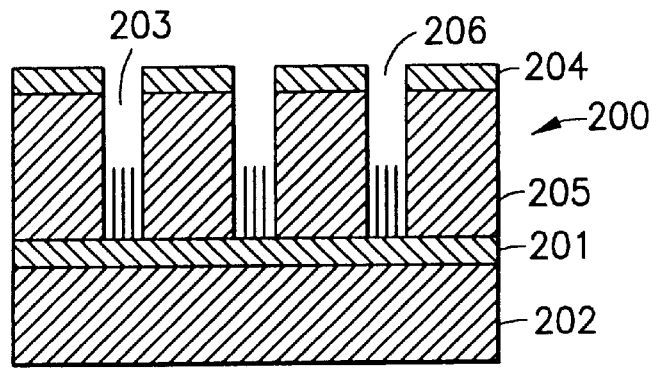
FIGS. 9A–9C illustrate views of a representative schematic of a matrix addressable cold cathode device according to one embodiment of the present invention.
Figure 9B:
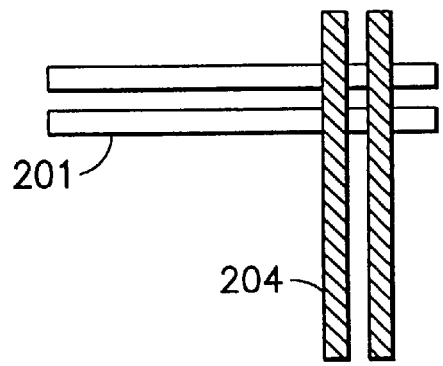
Figure 9C:
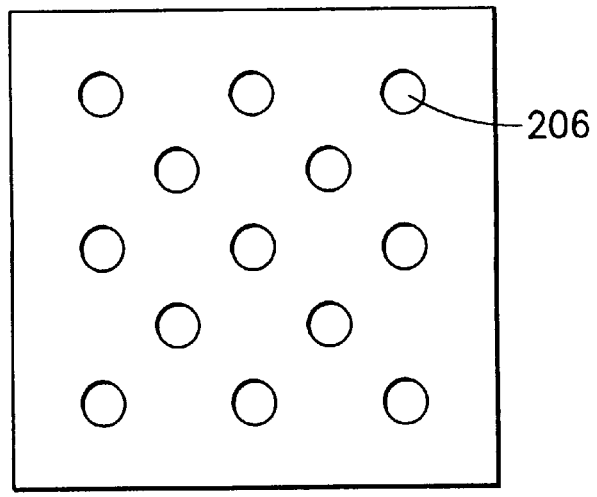

FIGS. 9A–9C show schematics of a matrix addressable cold cathode 200. FIG. 9A illustrates a cross-sectional schematic of the device. The device comprises metal rows 201 applied onto a substrate 202. The metal rows 201 correspond to the conductor on which the fiber emitters 203 are grown. The column electrode 204 corresponds to the gate metal of the cold cathode 200. The dielectric 205 is applied on the metal rows 201. FIG. 9B illustrates a top schematic view of the device depicting the column electrodes 204 and metal rows 201. FIG. 9c is an inset view of FIG. 9B and illustrates the fiber emitters 203 inside the gate openings 206 (white circles).

The fabrication processes for matrix addressable cold cathodes are similar to the fabrication of cold cathodes described in the previous sections, with additional patterning of row and column metals. An insulating substrate is first deposited with row metal, followed by the deposition of dielectric and column gate metal. Field emission cold cathodes are fabricated at the intersection area of the row and column metals using the various processes described in the previous sections.

Figure 10:
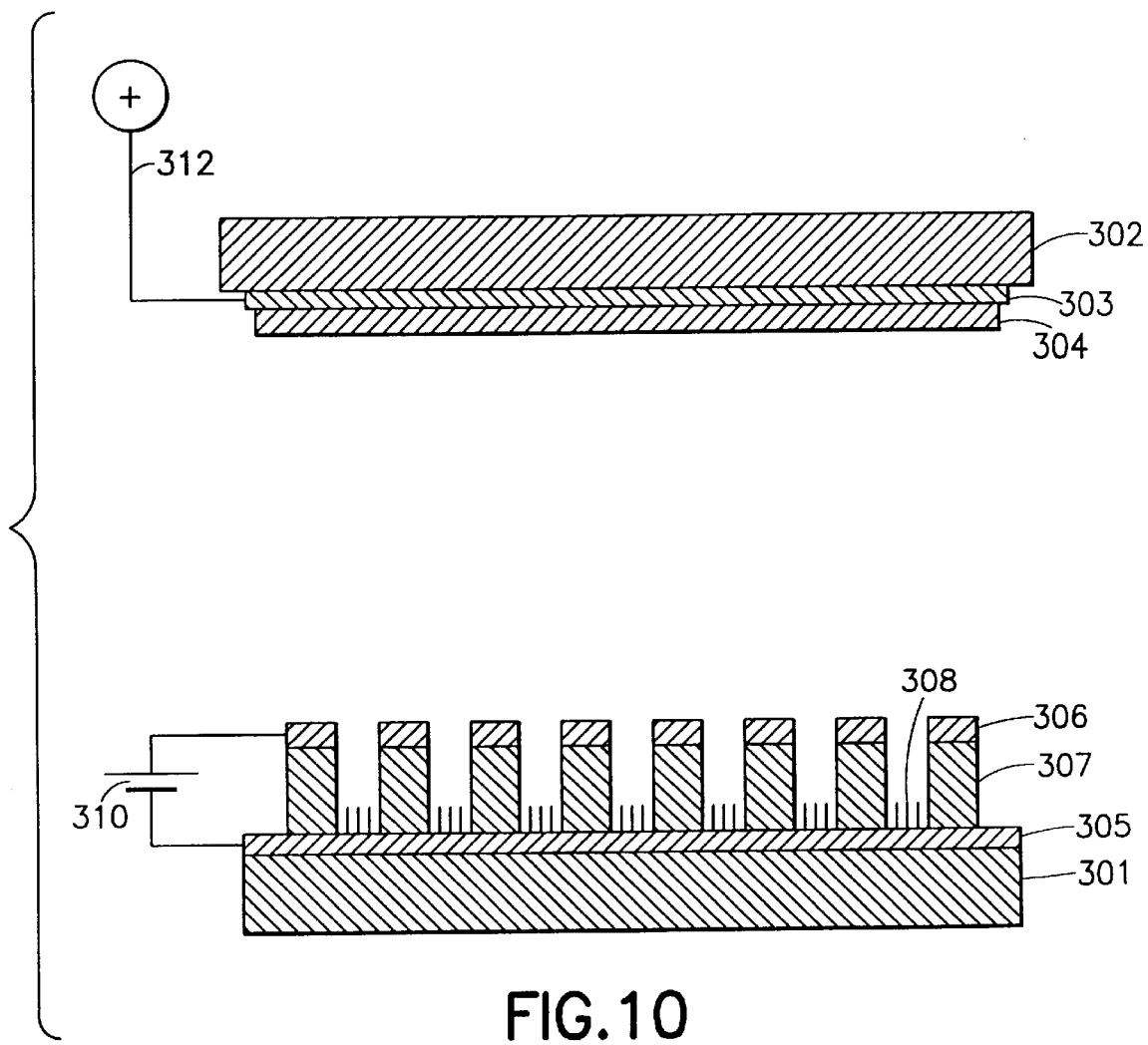
FIG. 10 illustrates a cross-sectional view of a representative schematic of a cold cathode display device with a triode structure according to one embodiment of the present invention.

The field emission cold cathodes described in the previous sections can be used to construct display devices. FIG. 10 shows a schematic of a display device incorporating the cold cathodes according to the invention. The display device includes two substrates separated by an insulator spacer (the spacer is not shown in the schematic) which forms a cavity which is evacuated to a pressure below about $10^{-5}$ Torr and sealed. Field emission electron sources (cold cathodes) are fabricated on a cathode substrate 301. The other display substrate 302 is a transparent insulator and is coated with a transparent collector electrode (for example, indium tin oxide) 303 and a luminescent material (phosphor) 304. During operation, the gate metal 306, which is on the dielectric layer 307, is biased positively 310 with respect to the base conductor 305, causing electron emission from the carbon emitters 308. The electrons are accelerated to the luminescent material layer 304 and the collector electrode which is biased 312 at a few hundred volts to several kilovolts. The luminescent material emits light when electrons impact. The emission current is determined by the potential difference between the gate metal and the base conductor.

The electron source for the display can be one or many cold cathodes that turn on simultaneously. In this case, the display is essentially a cold cathode vacuum fluorescent light source.

When the matrix addressable cold cathodes are used, the display is essentially a thin cathode-ray tube. Furthermore, when the luminescent materials are red, green, and blue phosphors, arranged in a pattern corresponding the addressable cathode pixel pattern, a full-color display can be made.

A display device with diode structure may also be fabricated. Such a device with the diode structure will be low cost. A substrate with catalytically grown carbon fibers on its surface has an exceptional field emission property. The macroscopic electric field required to turn on the emitters is below 2 V/$\mu$m. This is compared to about 20 V/$\mu$m for nanocrystalline diamond (see, for example, C. Xie et al., *7th International Vacuum Microelectronics Conference, Revue*, "Le Vide, les Couches Minces"—Supplément au N° 271-Mars-Avril 1994, pages 229–232). The matrix addressable display can be made using catalytically grown carbon fiber emitters and low voltage phosphors.

Figure 11A:
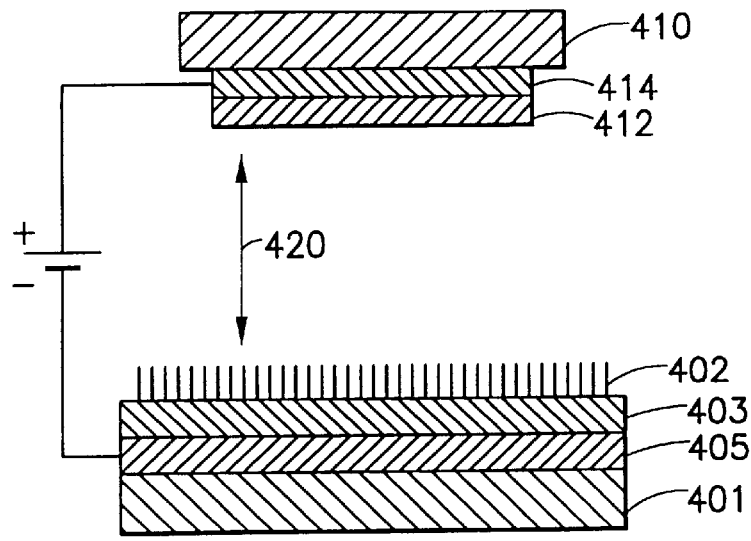
FIGS. 11A–11C illustrate views of a representative schematic of a cold cathode display having a diode structure according to one embodiment of the present invention.
Figure 11B:
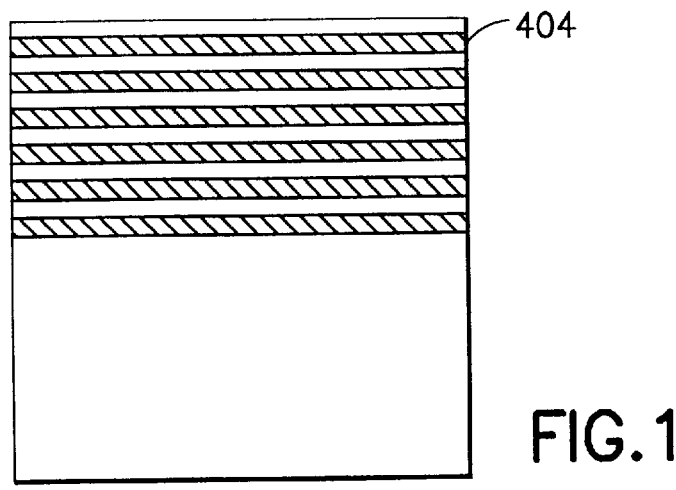
Figure 11C:
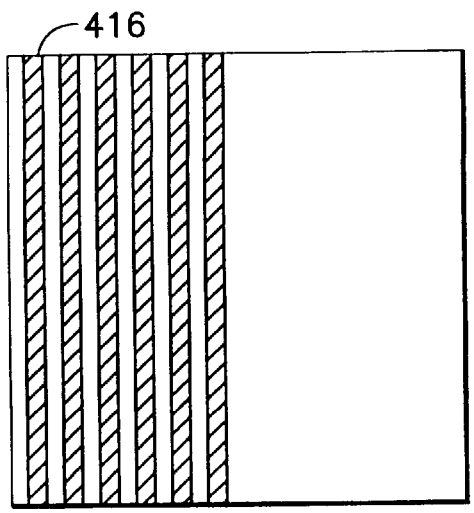

FIGS. 11A–11C illustrate a schematic of such a display. The display consists of two substrates, a first substrate 401 with emitters 402 arranged in a row fashion 404. The emitters are on a catalyst film 403 which is on the conductor layer 405. FIG. 12B illustrates a top view schematic of emitter rows 404 on the first substrate 401. A second transparent substrate 410 with phosphor 412 and transparent electrode 414 arranged in a column fashion 416. FIG. 12C illustrates a top schematic view of the phosphor columns 416 on the second substrate 410. The two substrates are parallel and are separated by a distance 420 of less than 100 micrometers. Because the I–V curve of the carbon fiber is very steep, when a proper voltage is applied between a column electrode and a row electrode, field emission only occurs at the intersection of the addressed column electrode and the addressed row electrode, so that only the pixel element addressed by the column electrode and the row electrode will light up. By addressing each pixel element, an image can be displayed. When the phosphors are arranged in colors of red, green and blue, a full color image can be displayed.

The features and advantages of the invention are more fully illustrated by the following non-limited examples.

EXAMPLES

Example 1
Fabrication of an Electron Emitter Surface Using a Catalyst Metal Film Uniform electron emissive surfaces have been fabricated by catalytically growing carbon fibers on a substrate surface. Three types of catalysts containing a transition metal (e.g., iron, cobalt, nickel) have been used, namely, very thin metal films, compounds, and ultrafine catalyst particles. Several growth conditions were also evaluated.

Very thin metal films of iron, cobalt and nickel were used to fabricate uniform field emitters on substrate surfaces. The thin metal film nucleated upon heating forming small uniform metal clusters which catalyzed the growth of carbon fibers on the substrate surface during heating at temperatures above about 300° C. in a gas environment containing hydrocarbons, carbon-containing compounds or carbon monoxide. The films were iron, cobalt or nickel and were 25 to 100 Å thick. The substrates (silicon with native oxide) were heated to temperatures ranging from 450–750° C. in 0.1–1 Torr of acetylene for various periods of time ranging from about 5 minutes to about one hour. For all conditions examined, carbon fiber emitters having diameters of about 20–100 nm were obtained.

Figure 12:
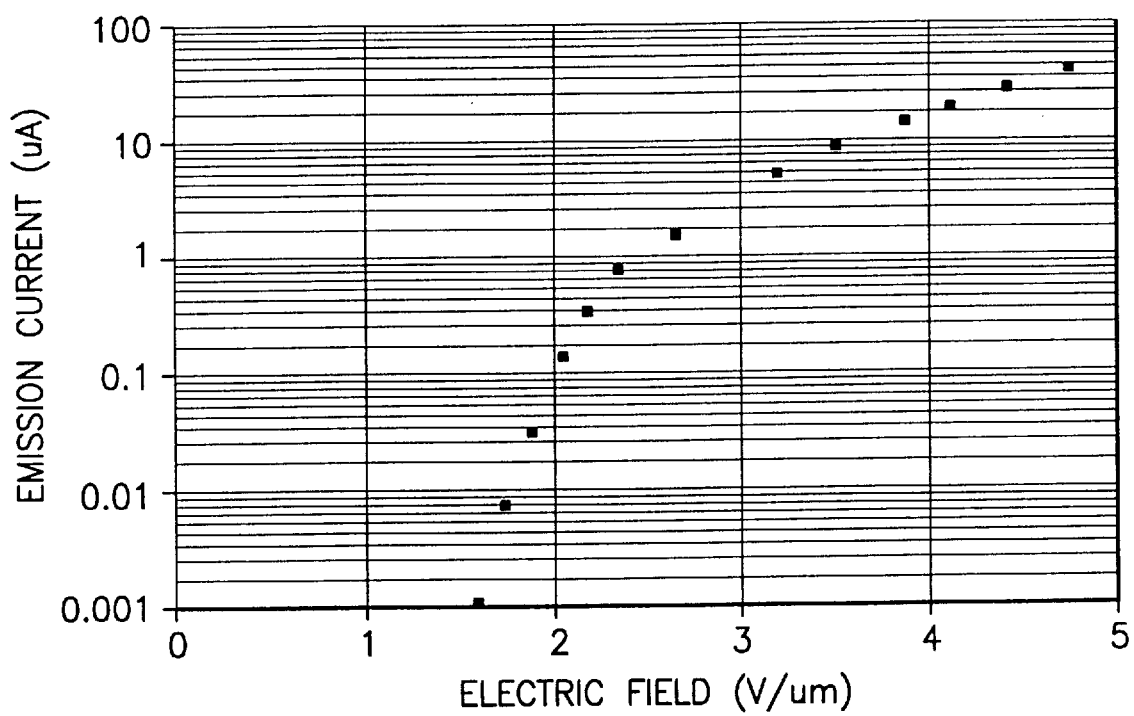
FIG. 12 illustrates a graphical representation of a relationship between emissive current and electric field for a typical emissive surface fabricated by catalytically growing carbon fibers on the surface. The vertical axis represents emission current and the horizontal axis represents macroscopic electric field.

The field emission properties of the surface were measured (an example is shown in FIG. 12). The emission current was measured as a function of anode voltage, with the anode suspended 0.025" above the surface. The anode was made of an 1/16" diameter metal ball. The surface has a very low turn-on electric field of 2 V/$\mu$m, and very sharp initial turn-on I–V characteristics.

Example 2
Ferrocene Aldehyde Compounds as Catalysts for the Growth of Carbon Fibers Ferrocene aldehyde was dissolved in a solvent (mixture of 2-ethoxyethyl acetate, xylenes and n-butylacetate). The resulting solution was spin-coated onto a silicon wafer to form a uniform film. The wafer was then rapidly annealed to 800° C. for a few minutes in 5% $H_2$ in $N_2$ to grow carbon emitters. During annealing, ferrocene aldehyde decomposes and is reduced to form fine iron particles which catalyze carbon fiber growth. The carbon source in this case is supplied by decomposition of ferrocene aldehyde and residual solvents. Scanning electron microscopy showed that the substrate surface was covered with dense and uniform carbon fibers with diameters on the order of 100 nanometers. This surface showed a very good electron emissive properties. Testing showed that the surface emitted electrons at an applied electric field of less than 10 V/$\mu$m. The emission current density was as high as 1 A/cm$^2$.

Example 3
Ultrafine Catalyst Particles

Electron emissive surfaces can be fabricated using ultrafine catalyst particles. The catalyst used was iron oxide particles ($Fe_2O_3$) that were about 3 nm in diameter. In detail, the fabrication of electron emissive surface can be broken down into several steps: (1) suspension of iron oxide particles in a solution that has a high carbon concentration, for example, a photoresist dissolved in acetone, (2) dispersing the particle containing suspension onto a substrate surface, (3) heating in air at about 100° C. to remove the solvent, (4) rapidly thermally annealing at temperatures in the range 500–1100° C. for times on the order of a few seconds to several minutes.

Testing showed that the surface after this process is electron emissive. It emitted electrons at an applied electric field of less than 10 V/$\mu$m. Scanning electron microscopy showed that the result was a surface that was covered with carbon fibers. The fiber growth was proceeded by the reduction of catalyst particles during the rapid thermal annealing followed by fiber nucleation and growth. The carbon source for the fiber growth originated from the photoresist which decomposed during the heating stage. The density of carbon fibers on the substrate surface produced in this process was lower than the fiber density produced in the process using ferrocene aldehyde or the iron film.

Other finely dispersed catalyst particles or colloids can also be used to fabricate electron emissive surface. The catalyst particles can be metallic particles or oxides of transition metals such as iron, cobalt, nickel, or alloys containing these elements. The fabrication of emissive surface using catalyst particles, in general, involves suspending of particles in a solution and then dispersing the solution onto a substrate surface. The substrate with catalyst particles on its surface is then heated to temperatures 400–1100° C. in an atmosphere containing carbon source. Carbon fiber will grow on the substrate surface catalyzed by the metal particles. The carbon source can either be originated from the decomposition of residual solvents or be externally supplied with hydrocarbon gases.

Example 4
Fabrication of a 20×20 Matrix Addressable Cold Cathode

We fabricated a 20×20 matrix addressable field emission cold cathode to illustrate the fabrication of micron-scale field emission devices like a matrix-addressable field emission display cathode that incorporates carbon fibers as the electron emitters. The fabrication process can be easily adapted to larger areas, larger pixel densities and mass production. The process steps are:

On an 1" square ceramic substrate wafer, an about 2000 Å thick molybdenum film was deposited. photoresist layer was spin-coated on the molybdenum film and exposed to UV light through a photomask. The photoresist layer was developed and the molybdenum film was etched in an acidic solution. The photomask was designed so that after these processes, 20 parallel molybdenum lines were present on the substrate surface. The molybdenum lines were 400 microns wide, 20 mm long and 100 microns apart from one another. These molybdenum lines are the column electrodes.

Subsequently, an about 1 microns thick silicon dioxide film was deposited by a plasma-assisted chemical vapor deposition process onto the substrate covered with the molybdenum line pattern.

An about 2000 Å of the molybdenum film was subsequently deposited on the silica film. The molybdenum film was photolithographically patterned and etched to yield 20 molybdenum lines on the silica film. These 20 molybdenum lines on the dielectric film act as gate electrodes and were aligned so that they were perpendicular to the molybdenum column electrodes underneath the dielectric.

A photoresist was spin-coated on the wafer which had the electrode and dielectric patterns on its surface. The photoresist was exposed to UV light through a photomask and developed. The photomask was designed to produce circular openings in the area where the gate and column electrodes intersect. The diameter of the openings was 2 microns and distance between the center of the openings was 10 microns. There were more than a thousand openings in the intersection area. After developing the photoresist pattern, 2-micron diameter holes were produced in the photoresist to expose the molybdenum gate electrodes. The exposed molybdenum was etched in an acidic solution to expose the underlying dielectric. An intentional over-etching of molybdenum was used to produce openings in the gate metal slightly larger than the openings in the photoresist. The exposed dielectric was etched with dilute hydrofluoric acid to expose the underlying column electrodes. After processing, at the column and gate intersection there was a structure with openings from the photoresist layer through the gate electrode through the dielectric layer to the column electrode. The openings in the photoresist, gate and dielectric were about 2 microns, 3 microns and 3–4 microns, respectively.

Subsequently, a thin film of catalyst support material was deposited. Both silica (<100 Å) and silicon carbide (1000–2000 Å) have been used (separately).

A catalyst film was deposited on the catalyst support structure. The catalyst film used was an iron film with a thickness of about 20–100 Å.

The wafer was subsequently placed in a photoresist stripper solvent. This process dissolved the remaining photoresist film and lifted off the portion of the catalyst film and catalyst support that was in contact with the photoresist. This left the catalyst and support only in the center of the gate openings and on the column electrodes.

Subsequently, the wafer was heated in 200 millitorr of acetylene at 650° C. for about one minute. Carbon fiber emitters were grown on the support structure in contact with the column electrode and centered in the gate openings.

Electron emission from each pixel was achieved by applying a positive potential to the corresponding gate electrode and a negative potential to the corresponding column electrode. With an applied potential difference of 20–30 volts a measurable emission current was obtained for each pixel.

While the invention has been described herein with reference to specific aspects, features, and embodiments, it will be apparent that other variations, modifications, and embodiments are possible, and all such variations, modifications and embodiments therefore are to be regarded as being within the spirit and scope of the invention.

What is claimed is:

1. A field emission device comprising:
   a substrate; and
   a plurality of electron emitter structures comprising carbon-containing fibers crown onto and attached to a surface of the substrate;
   wherein portions of the surface have an electron emitter structure density greater than about 0.1 electron emitter structures per square micron.

2. A field emission device comprising:
   a substrate; and
   at least one electron emitter structure comprising a carbon-containing fiber attached to a surface of the substrate;
   wherein the carbon-containing fiber is grown on the surface and hence chemically bonded to the substrate.

3. A field emission device according to claim 2, wherein the carbon-containing fiber is grown catalytically on the growth surface.

4. A field emission device according to claim 2, wherein the substrate comprises at least one material selected from the group consisting of ceramics, glasses, semiconductors, metals or alloys.

5. The field emission device according to claim 2, wherein the carbon-containing fiber has an average diameter less than 10 microns.

6. The field emission device according to claim 2, wherein the carbon-containing fiber has an average height to width ratio greater than about 2.

7. The field emission device of claim 2, further comprising gate means for controlling the application of electric fields to the electron emitter structure.

8. The field emission device according to claim 7, wherein the gate means comprises a gate opening having a width less than about 10 microns.

9. The field emission device of claim 8, wherein the electron emitter structure comprises a carbon-containing fiber comprises emitter ends, wherein the distance between at least one of the emitter ends and gate opening is less than about 5 microns.

10. The field emission device of claim 2, further comprising an anode, wherein the carbon-containing fiber comprises emitter ends and the distance between at least one of the emitter ends and the anode is less than about 100 microns.

11. The field emission device according to claim 2, wherein portions of the growth surface have an electron emitter structure density greater than about 0.1 electron emitter structures per square micron.

12. The field emission device according to claim 2, wherein the carbon-containing fiber comprises the catalyst material.

13. The field emission device according to claim 12, wherein the at least one transition metal compound is selected from the group consisting of Fe, Co, Ni, Mn, Cr, Mo, W, Re, Ru, Os, Rh, Ir, Pd, Pt, Cu and Zn.

14. The field emission device according to claim 2, wherein the growth surface comprises a metal film.

15. The field emission device according to claim 14, wherein the metal film comprises at least one transition metal or compound or alloy thereof.

16. The field emission device according to claim 15, wherein the at least one transition metal is selected from the group consisting of Fe, Co, Ni, Mn, Cr, Mo, W, Re, Ru, Os, Rh, Ir, Pd, Pt, Cu and Zn.

17. The field emission device according to claim 2, wherein the growth surface comprises a semiconductor or dielectric.

18. The field emission device according to claim 2, wherein the device comprises a plurality of electron emitter structures arranged on the growth surface.

19. The field emission device according to claim 18, further comprising a plurality of electrically isolated regions each having at least one electron emitter structure.

20. The field emission device according to claim 2, further comprising a means for supplying electric current to the electron emitter structure sufficient to replenish field emitted charge.

21. The field emission device of claim 20, comprising a plurality of electron emitter structures arranged as a plurality of field emission cathode regions each having a plurality of electron emitter structures, the plurality of field emission cathode regions being spaced apart on the substrate.

22. The field emission device of claim 21, further comprising a dielectric region formed on the substrate, the dielectric region having a plurality of apertures there through defining the field emission cathode regions; and a plurality of gate electrodes formed on a surface of the dielectric region opposite the substrate.

23. The field emission device of claim 22, wherein the means for supplying electric current comprises a plurality of row electrodes forming portions of the growth surface on which the electron emitter structures of the plurality of field emission cathode regions are formed, the plurality of field emission cathode regions are arranged in a rectangular pattern on the plurality of row electrodes, and the plurality of gate electrodes are arranged in a plurality of columns with respect to the rectangular pattern of the plurality of field emission cathode regions.

24. A vacuum-collector transistor comprising the field emission device of claim 2 and further comprising a collector region comprising a vacuum region and an anode.

25. A electron microscope comprising the field emission device of claim 2.

26. A spectrometer comprising the field emission device of claim 2.

27. A display device comprising the field emission device of claim 2.

28. A cold cathode vacuum fluorescent light source comprising the field emission device of claim 2 and a phosphor plate opposite the carbon-containing fiber to receive the electrons and emit light.

29. The field emission device according to claim 1, wherein the carbon-containing fibers are produced in situ.

30. The field emission device according to claim 1, wherein the substrate comprises at least one material selected from the group consisting of ceramics, glasses, semiconductors, metals and alloys.

31. The field emission device according to claim 1, wherein the carbon-containing fibers have an average diameter less than one micron.

32. The field emission device according to claim 1, wherein the carbon-containing fibers have an average height to width ratio greater than about 2.

33. The field emission device according to claim 1, further comprising a gate for controlling the application of electric fields to the electron emitter structure.

34. The field emission device according to claim 1, further comprising an anode for receiving emitted electrons.

35. The field emission device according to claim 1, wherein the device comprises a plurality of electron emitter structures arranged on the surface of the substrate.

36. The field emission device according to claim 35, further comprising a plurality of electrically isolated regions each having at least one electron emitter structure.

37. The field emission device according to claim 1, further comprising an electric current supply to the electron emitter structures sufficient to replenish field emitted charge.

38. The field emission device of claim 37, further comprising a plurality of electron emitter structures arranged as a plurality of field emission cathode regions each having a plurality of electron emitter structures, the plurality of the field emission cathode regions being spaced apart on the substrate.

39. The field emission device of claim 38, further comprising a dielectric region formed on the substrate, the dielectric region having a plurality of apertures there through defining the field emission cathode regions; and a plurality of gate electrodes formed on a surface of the dielectric region opposite the substrate.

40. The field emission device of claim 39, wherein the electric current supply comprises a plurality of row electrodes forming portions of the surface on which the electron emitter structures of the plurality of field emission cathode regions are formed, the plurality of field emission cathode regions are arranged in a rectangular pattern on the plurality of row electrodes, and the plurality of gate electrodes are arranged in a plurality of columns with respect to the rectangular pattern of the plurality of field emission cathode regions.

41. A cold electron source comprising the field emission device of claim 1.

42. A vacuum-collector transistor comprising the field emission device of claim 1 and further comprising a collector region comprising a vacuum region and an anode.

43. An electron microscope comprising the field emission device of claim 1.

44. A spectrometer comprising the field emission device of claim 1.

45. A display device comprising the field emission device of claim 1.

46. A cold light source comprising the field emission device of claim 1 and a phosphor plate opposite the carbon-containing fiber to receive the electrons and emit light.

47. A vacuum pressure gauge comprising the field emission device of claim 1.

48. The field emission device according to claim 2, wherein the carbon-containing fiber is produced in situ.

49. The field emission device according to claim 2, wherein the carbon-containing fiber has an average diameter less than one micron.

50. The field emission device according to claim 2, further comprising an anode for receiving emitted electrons.

51. A cold electron source comprising the field emission device of claim 2.

52. A vacuum pressure gauge comprising the field emission device of claim 2.

* * * * *

UNITED STATES PATENT AND TRADEMARK OFFICE
CERTIFICATE OF CORRECTION

PATENT NO : 5,973,444
DATED : October 26, 1999
INVENTOR(S) : Xu et al.

It is certified that errors appears in the above-identified patent and that said Letters Patent is hereby corrected as shown below:

Title page, above item [57] Abstract, change Zitzman to --Zitzmann--
Cover Page: change "Zitzman" to --Zitzmann--
Column 2, line 18, change "The." to --The--
Column 8, line 47, change "catalystcontaining" to --catalyst-containing--
Column 22, line 17, change "crown" to --grown--

Signed and Sealed this

Thirtieth Day of May, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,973,444
DATED : October 26, 1999
INVENTOR(S) : Xu et al

It is certified that error appears in the above-identified patent and that said Letters Patent is hereby corrected as shown below:

Column 1, line 7, insert

--GOVERNMENT RIGHTS IN INVENTION

This invention was made with the support of the U.S. Government under Contract No. N00014-96-C-0266 awarded by the Office of Naval Research. The Government has certain rights in this invention.--

Signed and Sealed this

Twenty-sixth Day of December, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO.     : 5,973,444
DATED          : October 26, 1999
INVENTOR(S)    : Xu et al.

It is certified that error appears in the above-identified patent and that said Letters Patent is hereby corrected as shown below:

Column 1,
Line 7, insert

-- GOVERNMENT RIGHTS IN INVENTION

This invention was made with the support of the U.S. Government under Contract No. N00014-96-C-0266 awarded by the Office of Naval Research. The Government has certain rights in this invention. --

Signed and Sealed this

Ninth Day of September, 2003

JAMES E. ROGAN
*Director of the United States Patent and Trademark Office*